US012800480B2

(12) United States Patent
Suzuki et al.

(10) Patent No.: US 12,800,480 B2
(45) Date of Patent: Nov. 17, 2026

(54) LIGHT SOURCE UNIT

(71) Applicant: HAMAMATSU PHOTONICS K.K., Hamamatsu (JP)

(72) Inventors: Tomofumi Suzuki, Hamamatsu (JP); Takuma Osaki, Hamamatsu (JP); Tatsuya Sugimoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 19/037,938

(22) Filed: Jan. 27, 2025

(65) Prior Publication Data

US 2025/0258086 A1 Aug. 14, 2025

(30) Foreign Application Priority Data

Feb. 9, 2024 (JP) ................................ 2024-018588

(51) Int. Cl.
*G01N 21/25* (2006.01)
*G02B 6/36* (2006.01)

(52) U.S. Cl.
CPC ......... *G01N 21/255* (2013.01); *G02B 6/3624* (2013.01); *G01N 2201/061* (2013.01); *G01N 2201/063* (2013.01)

(58) Field of Classification Search
CPC ....... G01N 2201/063; G01N 2201/061; G01N 21/255; G02B 6/3624
See application file for complete search history.

(56) References Cited

U.S. PATENT DOCUMENTS

| | | | | |
|---|---|---|---|---|
| 7,121,737 B2 * | 10/2006 | Kato | G10C 3/12 | 385/88 |
| 9,772,230 B2 * | 9/2017 | Ehbets | G01J 3/50 | |
| 2003/0169421 A1 * | 9/2003 | Ehbets | G01J 3/0272 | 356/406 |
| 2007/0070351 A1 * | 3/2007 | Nou | G01N 21/255 | 356/446 |
| 2014/0103224 A1 * | 4/2014 | Ng | G01N 21/05 | 250/435 |
| 2023/0218153 A1 * | 7/2023 | Liu | H01L 25/0753 | 359/601 |
| 2024/0004144 A1 * | 1/2024 | Suzuki | G01J 3/42 | |
| 2024/0180403 A1 * | 6/2024 | Joshi | A61B 1/3132 | |
| 2024/0319079 A1 * | 9/2024 | Chang | G01J 3/0221 | |
| 2025/0297962 A1 * | 9/2025 | Zhou | G01N 21/31 | |

FOREIGN PATENT DOCUMENTS

JP 2009-115669 A 5/2009

* cited by examiner

*Primary Examiner* — Christopher E Dunay
(74) *Attorney, Agent, or Firm* — Faegre Drinker Biddle & Reath LLP

(57) ABSTRACT

A light source unit includes a plurality of light sources for emitting light with which an object is to be irradiated; a converging lens for converging light from the object; an optical fiber connector for holding an optical fiber that receives an incidence of the light converged by the converging lens; and a base made of metal and configured to hold the light sources, the converging lens, and the optical fiber connector. The base includes a first surface, a second surface opposite to the first surface, a first region including a center of the base when viewed in a first direction intersecting the first surface, a second region surrounding the first region when viewed in the first direction.

12 Claims, 13 Drawing Sheets

LIGHT SOURCE UNIT

TECHNICAL FIELD

The present disclosure relates to a light source unit.

BACKGROUND

Patent Literature 1 (Japanese Unexamined Patent Publication No. 2009-115669) describes a meat fatty acid content measurement device. The device includes a probe and a device body. The probe includes a plurality of light sources; a holder that holds the plurality of light sources such that the surface of meat is irradiated with light from the plurality of light sources; and an optical fiber of which an incident end is disposed at a position where reflected light from the meat is incident. The light sources and the incident end of the optical fiber are provided inside a housing of the probe. A measurement opening is formed at the center of a bottom plate portion of the housing. A right-angle prism is provided on a central axis of the housing above the measurement opening.

The incident end of the optical fiber is located at the same height position as the right-angle prism. An optical axis when the light from the meat is captured passes through the center of a total reflecting surface of the right-angle prism. A converging lens that converges the light from the meat and that allows the light to be incident on the optical fiber is provided on the optical axis. The holder is a member having a disk shape as a whole, and is provided with five holding holes for holding the light sources.

SUMMARY

In the above-described technical field, there is a demand to enable light from an object to be more efficiently incident on an optical fiber while ensuring the amount of light from a light source with which the object is to be irradiated. Therefore, in the device described in Patent Literature 1, for example, it is considered that the converging lens is disposed closer to the object by holding the converging lens together with the light sources using the holder.

However, in this case, the converging lens and the light sources are close to each other, so that heat generated in the light sources is easily transferred to the converging lens. As a result, the converging lens expands due to heat, the focal position is misaligned due to the thermal lens effect, or damage occurs in the converging lens, which is a risk. In addition, for example, when the converging lens is fixed to the holder using resin, fixing strength decreases due to the heat, so that optical axis misalignment of the converging lens occurs, which is a risk.

Therefore, an object of the present disclosure is to provide a light source unit capable of reducing the influence of heat on a converging lens.

[1] A light source unit according to the present disclosure is "a light source unit including: a plurality of light sources configured to emit light with which an object is to be irradiated; a converging lens configured to converge light from the object; an optical fiber connector configured to hold an optical fiber that receives an incidence of the light converged by the converging lens; and a base made of metal and configured to hold the light sources, the converging lens, and the optical fiber connector. The base includes a first surface, a second surface opposite to the first surface, a first region including a center of the base when viewed in a first direction intersecting the first surface, a second region surrounding the first region when viewed in the first direction, a first space provided in the first region and penetrating through the base to have a first opening on the first surface and a second opening on the second surface, and a plurality of second spaces provided in the second region and having third openings on the first surface. The optical fiber connector is held by the base while at least a part of the optical fiber connector is accommodated in the first space. The converging lens is held by the base while at least a part of the converging lens is accommodated in the first space on a first opening side with respect to an end surface on the first opening side of the optical fiber held by the optical fiber connector. Each of the plurality of light sources is held by the base while at least a light emitting region of the light source is accommodated in the second space. A thickness of the first region in the first direction is thicker than a thickness of the second region in the first direction."

In the light source unit, the plurality of light sources that emit the light with which the object is to be irradiated, the converging lens for converging the light from the object, and the optical fiber connector for holding the optical fiber that receives the incidence of the light converged by the converging lens are held by the same base. The base has the first surface and the second surface opposite to the first surface, and when viewed in first direction intersecting the first surface, includes the first region including the center of the base, and the second region surrounding the first region. The first space that is a through-hole that opens to the first surface and the second surface is formed in the first region, and the second spaces that open to at least the first surface are formed in the second region. The light source is held by the base such that at least the light emitting region is accommodated in the second space.

Therefore, the object is irradiated from the first surface side of the base with the light emitted from the light emitting region of the light source. In other words, the light from the object is incident on the first surface of the base. Meanwhile, the converging lens is held by the base while at least a part of the converging lens is accommodated in the first space that opens to the first surface of the base. Therefore, by locating the converging lens closer to the object, the light from the object that is incident from the first surface side of the base can be made to be more efficiently incident on the optical fiber (held by the optical fiber connector).

Here, in the light source unit, by making the base using metal having a relatively high thermal conductivity, heat dissipation is improved. Further, by making the first region of the base thicker than the second space of the base that accommodates the light emitting region of the light source, the first space that accommodates the converging lens and the like being provided in the first region, the thermal capacity of the first region is ensured. As a result, the transfer of heat generated in the light emitting region of the light source to the converging lens can be suppressed, and the influence of heat on the converging lens can be reduced.

Incidentally, by making the first region of the base relatively thick, the first space that accommodates the converging lens and the optical fiber connector being provided in the first region, the optical fiber connector can be inserted deeper into the first space, or a fixing region for the converging lens in the first region can be sufficiently ensured. Therefore, optical axis misalignment in the converging lens and the optical fiber connector can be suppressed. Further, at least a part of the converging lens and at least the light emitting region of the light source are accommodated in the first space and the second space, respectively. For this reason, the converging lens and the light emitting region of the light source can be reliably protected by the base. Further, by making the second region relatively thin, the second space that accommodates at least the light emitting region of the light source being provided in the second region, the light emitting region can be located closer to the object, so that the amount of light per unit area with which the object is to be irradiated can be ensured.

[2] The light source unit according to the present disclosure may be "the light source unit described in the above [1], in which a first positioning portion configured to position the converging lens in the first direction is formed in the base, and the converging lens is fixed to and held by the base in a state where the converging lens is positioned by the first positioning portion." In this case, the converging lens can be accurately fixed to the base.

[3] The light source unit according to the present disclosure may be "the light source unit described in the above [1] or [2], in which a second positioning portion configured to position the optical fiber connector in the first direction is formed in the base, and the optical fiber connector is fixed to and held by the base in a state where the optical fiber connector is positioned by the second positioning portion." In this case, the optical fiber connector can be accurately fixed to the base.

[4] The light source unit according to the present disclosure may be "the light source unit described in any one of the above [1] to [3], further including: the optical fiber held by the optical fiber connector. The light emitting region of each of the plurality of light sources is located closer to a first surface side than the end surface on a converging lens side of the optical fiber." In this case, the light emitting region of the light source and the converging lens can be disposed closer to the object. For this reason, the amount of light per unit area with which the object is to be irradiated can be ensured, and the light from the object can be more efficiently incident on the optical fiber.

[5] The light source unit according to the present disclosure may be "the light source unit described in any one of the above [1] to [4], in which each of the plurality of second spaces penetrates through the base to have a fourth opening on the second surface." In this case, in addition to the first space, the second space is also formed as a through-hole. For this reason, the light source can be mounted on the base from both the first surface side and the second surface side, so that the light source can be easily mounted on the base.

[6] The light source unit according to the present disclosure may be "the light source unit described in any one of the above [1] to [5], further including: a plurality of holding members that hold the plurality of respective light sources to constitute light source assemblies together with the light sources; and a plurality of support members configured to support a plurality of the respective light source assemblies via the holding members. Each of the plurality of light sources is held on the base by fixing the support member, which supports the light source assembly, to the second surface. Each of the plurality of support members includes a sliding surface configured to support the holding member so as to be slidable around an axis intersecting an optical axis of the light source." In this case, the light source assembly is slidable along the sliding surface of the support member to change the angle of the optical axis of the light source. Therefore, it becomes easier to adjust the optical axis of the light source.

[7] The light source unit according to the present disclosure may be "the light source unit described in the above [6], in which the support members are detachably fixed to the base." In this case, if any of the plurality of light sources fails, the failed light source can be removed and replaced for each support member that supports the light source assembly.

[8] The light source unit according to the present disclosure may be "the light source unit described in any one of the above [1] to [7], in which an entirety of the converging lens is accommodated in the first space." In this case, the protrusion of the converging lens from the first surface of the base can be avoided, and the converging lens can be reliably protected.

[9] The light source unit according to the present disclosure may be "the light source unit described in any one of the above [1] to [8], in which the first surface is a flat surface." In such a manner, by forming the first surface on an object side of the base as a flat surface, the object can be irradiated with light while bringing the first surface into contact with, for example, a glass window or the like.

[10] The light source unit according to the present disclosure may be "the light source unit described in any one of the above [1] to [9], in which the base includes a third region surrounding the second region when viewed in the first direction, and a spacer portion protruding from a surface on the first surface in the third region, the first opening and the third openings being provided on the surface." In this case, when the light source unit is disposed such that the spacer portion comes into contact with the object, the irradiation position of the light from the light source on the object in the first direction can be aligned according to the length of the spacer portion in the first direction. Particularly, when the optical axes of the plurality of light sources intersect each other at one point, by setting the length of the spacer portion in the first direction, the intersection point of the optical axes of the plurality of light sources can be easily and reliably positioned at a desired position on the object. For example, by setting the length of the spacer portion in the first direction to coincide with a length from the surface on the first surface to the intersection point, the first opening and the third openings being provided on the surface, positioning can be easily and reliably performed such that the intersection point is located on the surface of the object. In addition, compared to when a spacer formed separately from the base is disposed and used on the first surfaces, the accuracy of alignment can be improved.

According to the present disclosure, it is possible to provide the light source unit capable of reducing the influence of heat on the converging lens.

DETAILED DESCRIPTION

Hereinafter, one embodiment of a light source unit according to the present invention will be described with reference to the drawings. Incidentally, in the description of each drawing, the same or corresponding elements are denoted by the same reference signs, and duplicate descriptions may be omitted. In addition, each drawing may show an orthogonal coordinate system consisting of a first axis defining a first direction D1, a second axis defining a second direction D2 intersecting the first direction D1, and a third axis defining a third direction D3 intersecting the first direction D1 and the second direction D2.

Figure 1:
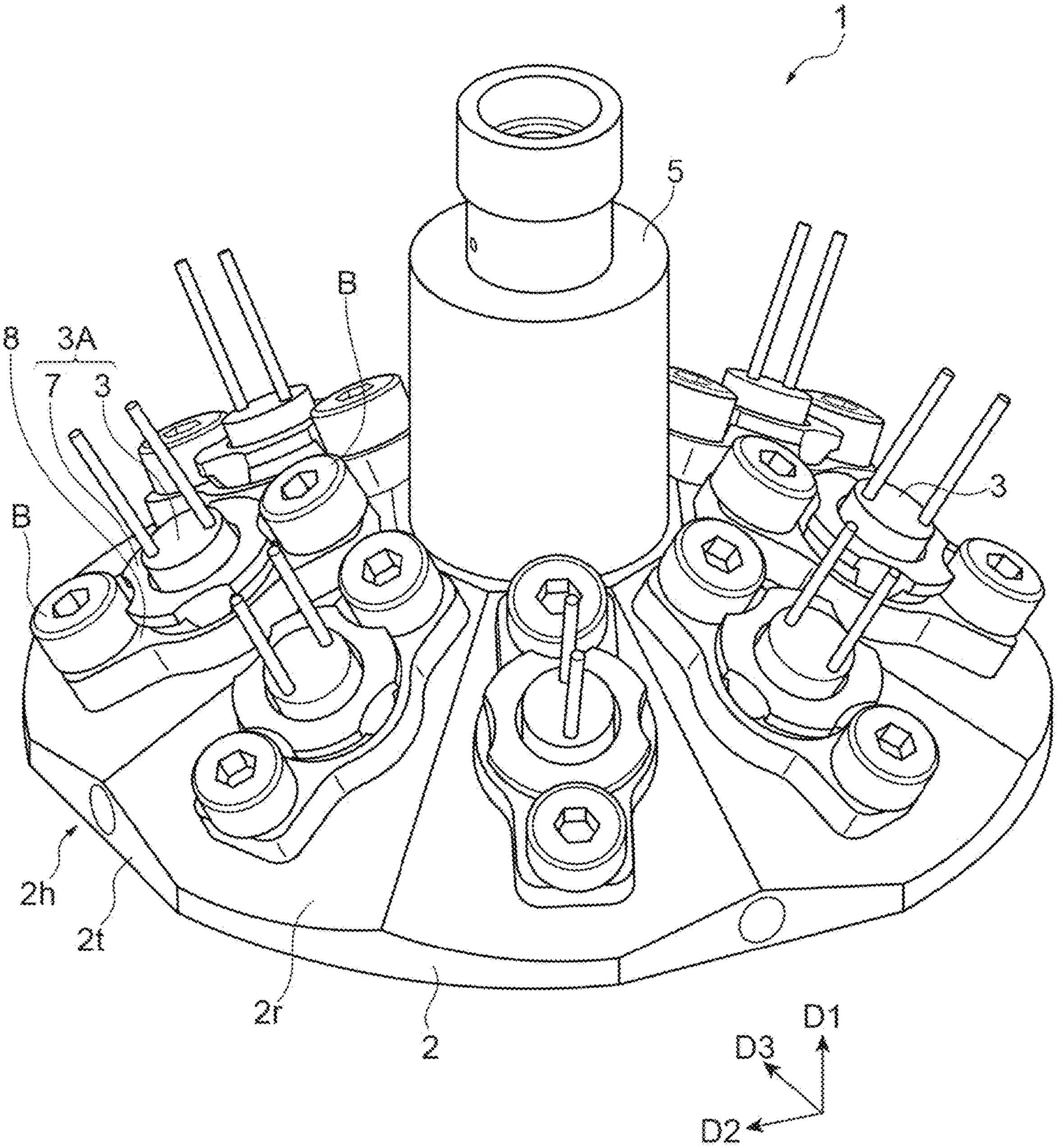
FIG. 1 is a perspective view of a light source unit according to the present embodiment.
Figure 2:
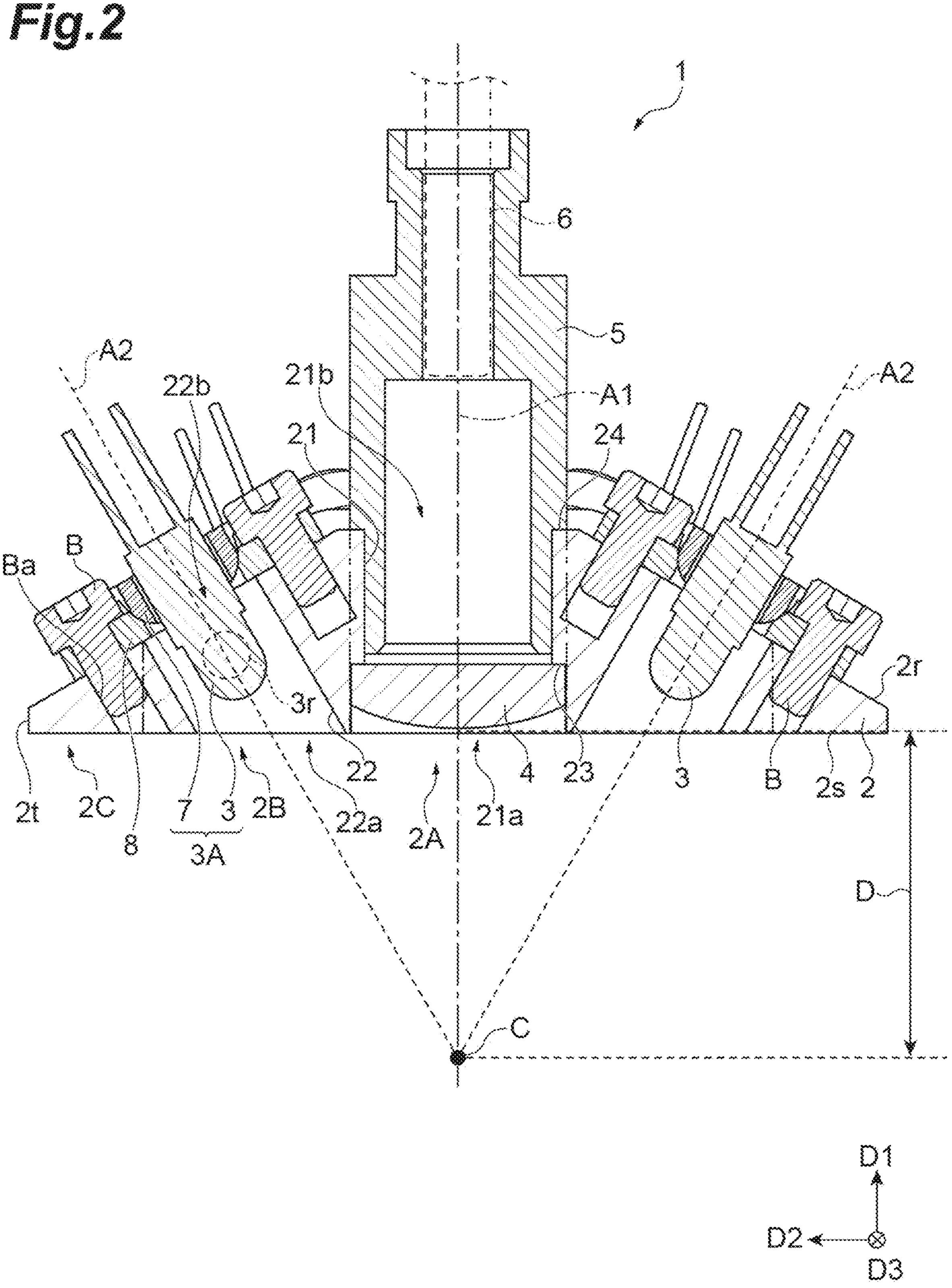
FIG. 2 is a cross-sectional view showing a cross section of the light source unit shown in FIG. 1, which includes a first direction D1 and a second direction D2.
Figure 3:
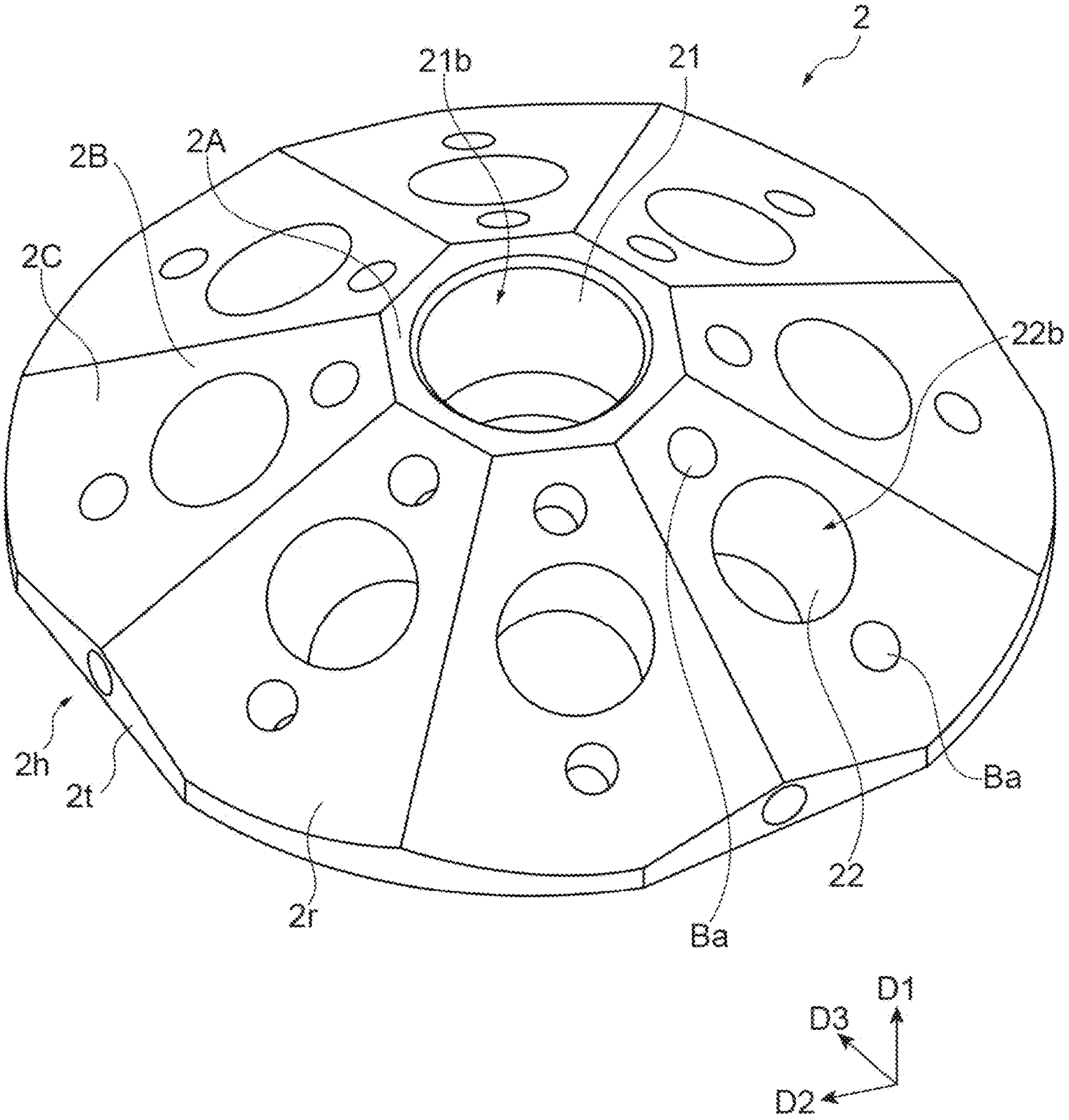
FIG. 3 is a perspective view showing a base shown in FIGS. 1 and 2.

FIG. 1 is a perspective view of the light source unit according to the present embodiment. FIG. 2 is a cross-sectional view showing a cross section of the light source unit shown in FIG. 1, which includes the first direction D1 and the second direction D2. FIG. 3 is a perspective view showing a base shown in FIGS. 1 and 2. A light source unit 1 shown in FIGS. 1 to 3 is provided, for example, inside an optical head of a measurement device including a spectrometer and the optical head. The spectrometer is, for example, a Fourier transform infrared spectrometer. In this case, the spectrometer includes, for example, an optical interferometer. The optical interferometer includes, for example, a light incident unit, a beam splitter, a fixed mirror, a movable mirror, and a photodetector. The photodetector acquires, for example, a light intensity signal that changes depending on the position of the movable mirror.

In addition, the optical head can also be optically connected to the spectrometer by an optical fiber. The optical head is disposed in the vicinity of an object to be measured, and receives electric power via a power supply cable to irradiate the object with light (using the light source unit 1). Some of the light with which the object is irradiated from the optical head is specularly reflected from the surface of the object, and the remaining light enters the inside of the object. The light that has entered the inside of the object is diffused while repeating refractive transmission, light scattering, and surface reflection inside the object, and some of the light is again emitted from the surface of the object to the outside of the object.

Since the light repeatedly transmits through the object multiple times during the optical diffusion process, a diffuse reflectance spectrum of the light is a measurement similar to a transmission spectrum. Therefore, the light is incident on the optical head (light source unit 1), and is provided to the spectrometer via the optical fiber, so that the object can be analyzed using an absorbance. In such a manner, the optical head (namely, the light source unit 1) is for irradiating the object with light and for receiving the incidence of return light from the object to provide the return light to the spectrometer (eventually to the photodetector of the spectrometer). Incidentally, examples of the object include medicines, plastics, plants, and the like.

The light source unit 1 includes a base 2, a plurality of (here, eight) light sources 3, a converging lens 4, an optical fiber connector 5, and an optical fiber 6. The base 2 holds the light sources 3, the converging lens 4, the optical fiber connector 5, and the optical fiber 6. The optical fiber 6 includes a fiber body and a coating material (ferrule) having a cylindrical shape and covering the fiber body, and can be held by the optical fiber connector 5 via the ferrule.

The light source 3 is for emitting light with the object is to be irradiated. The light source 3 is, as one example, a halogen lamp. However, any light source can be used as the light source 3. For example, the light source 3 may be a thermal light source or an incandescent light bulb such as a halogen lamp, a tungsten lamp, or a graphene light source, or may be a light emitting diode or a semiconductor laser such as a light emitting diode (LED), a laser diode (LD), a super luminescent diode (SLD) or a vertical cavity surface emitting laser (VCSEL).

The converging lens 4 is for converging the light (the return light) from the object. In the present embodiment, the converging lens 4 is a hemispherical lens that is convex to the side opposite to the optical fiber 6. A diameter (width in the second direction D2 in FIG. 2) of the converging lens 4 is larger than or equal to a diameter (width in the second direction D2 in FIG. 2) of the optical fiber 6. In addition, the diameter of the converging lens 4 may be larger than or equal to a width (width in a direction perpendicular to an optical axis direction of the light source 3) of a second space 22 to be described later, or may be larger than or equal to a minimum thickness of the base 2 (corresponding to a thickness of an end portion of the base 2 in the second direction D2 in the case of FIG. 2). By increasing the diameter of the converging lens 4, the light (return light) from the object can be made to be efficiently incident thereon. The diameter of the converging lens 4 (namely, a width of a first space 21 in the second direction D2 in FIG. 2 which will be described later) is, as one example, approximately 10 mm. The maximum value of a thickness of the converging lens 4 in the first direction D1 is, as one example, approximately 3 mm. A diameter of the optical fiber 6 (diameter of the ferrule) is, as one example, approximately 3 mm. The width of the second space 22 is, as one example, approximately 6 mm. The optical fiber connector 5 is for holding the optical fiber 6 that receives the incidence of the light converged by the converging lens 4.

The base 2 is made of, for example, metal such as aluminum. The base 2 has a first surface 2*s* and a second surface 2*r* opposite to the first surface 2*s*. The first surface 2*s* is a surface facing an object side when the light source unit 1 is in use (namely, when the object is irradiated with light). The first surface 2*s* is a flat surface extending to intersect (be perpendicular to) the first direction D1. The second surface 2*r* includes an inclined surface that is inclined in directions intersecting the first direction D1 (for example, the second direction D2 and the third direction D3) such that the distance from the first surface 2*s* increases as the inclined surface extends from a peripheral edge toward the center of the base 2.

Namely, the base 2 has a first region 2A including the center of the base 2 when viewed in the first direction D1 intersecting the first surface 2*s* (in the present embodiment, located at the center); a second region 2B surrounding the first region 2A when viewed in the first direction D1; and a third region 2C surrounding the second region 2B when viewed in the first direction D1, and including a peripheral edge portion of the base 2. The second region 2B is a continuous annular region including a region overlapping the second space 22 to be described later when viewed in the first direction D1. The first region 2A is a region inside the second region 2B when viewed in the first direction D1, and the third region 2C is a region outside the second region 2B when viewed in the first direction D1. Incidentally, in FIGS. 2, 8, 9, 11 and 12, a boundary between the first region 2A and the second region 2B and a boundary between the second region 2B and the third region 2C are indicated by one-dot chain lines.

A thickness of the first region 2A in the first direction D1 is thicker than thicknesses of the second region 2B and the third region 2C in the first direction D1. In the present embodiment, the thickness of the first region 2A in the first direction D1 is constant in the directions intersecting the first direction D1 (for example, the second direction D2 and the third direction D3), and the thickness of the second region 2B in the first direction D1 gradually increases in the directions intersecting the first direction D1 (for example, the second direction D2 and the third direction D3) to reach the thickness of the first region 2A as the second region 2B approaches the first region 2A. In addition, the thickness of the third region 2C in the first direction D1 gradually increases in the directions intersecting the first direction D1 (for example, the second direction D2 and the third direction D3) to reach the thickness of the second region 2B as the third region 2C approaches the second region 2B. Accordingly, the cross-sectional shape of the base 2 is a substantially trapezoidal shape.

Incidentally, the thickness of the first region 2A in the first direction D1 being thicker than the thickness of the second region 2B in the first direction D1 refers to at least one of a case where an average thickness of the first region 2A in the first direction D1 is thicker than an average thickness of the second region 2B in the first direction D1 and a case where a maximum thickness of the first region 2A in the first direction D1 is thicker than a maximum thickness of the second region 2B in the first direction D1. In the present embodiment, the average thickness of the first region 2A in the first direction D1 is thicker than the average thickness of the second region 2B in the first direction D1. The same applies to the relationship between the thickness of the second region 2B and the thickness of the third region 2C.

In addition, the thickness of the second region 2B in the first direction D1 is not limited to the case where the thickness of the second region 2B gradually increases as the second region 2B approaches the first region 2A. Namely, the second region 2B may have a constant thickness section in which the thickness of the second region 2B in the first direction D1 is constant on the way to the first region 2A. In addition, the thickness of the first region 2A and the second region 2B may be formed in two stages (in a step shape) (namely, the entirety of the second region 2B may be the constant thickness section described above). In addition, the second region 2B may have a section in which the thickness of the second region 2B in the first direction D1 decreases on the way to the first region 2A. In such a manner, the second region 2B may be configured such that the average thickness of the first region 2A is larger than the average thickness of the second region 2B. Similarly to the second region 2B, the thickness of the third region 2C in the first direction D1 is not also limited to the case where the thickness of the third region 2C gradually increases as the third region 2C approaches the second region 2B, and may be configured in the same manner as the second region 2B.

In addition, in the present embodiment, the minimum value of the thickness of the third region 2C in the first direction D1 is larger than 0. Accordingly, a third surface 2*t* connecting the first surface 2*s* and the second surface 2*r* is formed at an outer edge of the base 2. Accordingly, strength of the base 2 can be increased. Further, when viewed in the first direction D1, the center of the base 2 and the center of the first region 2A coincide with each other in the present embodiment, but may not coincide with each other.

A plurality of spaces for accommodating the plurality of light sources 3, the converging lens 4, and at least a part of the optical fiber connector 5 are formed in the base 2. Namely, the base 2 has one first space 21 provided in the first region 2A, and a plurality of (here, the same number as the light sources 3) the second spaces 22 provided in the second region 2B. Each of the first space 21 and the second spaces 22 is a through-hole penetrating through the base 2 from the first surface 2*s* to the second surface 2*r*.

Therefore, the first space 21 has a first opening 21*a* on the first surface 2*s* and a second opening 21*b* on the second surface 2*r*. In addition, the second space 22 has a third opening 22*a* on the first surface 2*s* and a fourth opening 22*b* on the second surface 2*r*.

The converging lens 4 and the optical fiber connector 5 are held by the base 2 while at least parts thereof are accommodated in the first space 21. In the present embodiment, a width of a portion of the optical fiber connector 5 in the first direction D1, the portion being inserted into the base 2, is larger than the thickness of the converging lens 4 in the first direction D1, and is larger than the minimum value of a thickness of the base 2 in the first direction D1 (in FIG. 2, a thickness of an outer edge portion of the base 2 in the first direction D1, and a length of the third surface 2*t* in the first direction D1). Accordingly, since the optical fiber connector 5 can be inserted deeply into the base 2, optical axis misalignment of the optical fiber connector 5 can be prevented. Incidentally, a width of the base 2 in the second direction D2 and the third direction D3 is, as one example, approximately 40 mm. The minimum value of the thickness of the base 2 in the first direction D1 is, as one example, approximately 1 mm. The maximum value of the thickness of the base 2 in the first direction D1 is, as one example, approximately 10 mm. The insertion width of the optical fiber connector 5 into the base 2 (the length of a portion of the optical fiber connector 5 in the first direction D1, the portion being inserted into the base 2) is, as one example, approximately 6 mm.

In the present embodiment, a part on a tip side of the optical fiber connector 5 is accommodated in the first space 21, and the entirety of the converging lens 4 is accommodated in the first space 21 on a first opening 21*a* side with respect to an end surface on the first opening 21*a* side of the optical fiber 6 held by the optical fiber connector 5. In the present embodiment, the converging lens 4 is located closer to the first opening 21*a* side than the optical fiber connector 5. A tapered surface that widens such that the inner diameter of the tapered surface increases as the tapered surface extends toward the tip side is formed on an inner surface of the tip of the optical fiber connector 5. By forming the tapered surface, some of the light traveling from an end portion side of the converging lens 4 toward the optical fiber 6 can be prevented from being shielded by the tip portion of the optical fiber connector 5. The converging lens 4 and the optical fiber connector 5 are arranged along the first direction D1 such that optical axes A1 of the optical fiber 6 held by the optical fiber connector 5 and the converging lens 4 coincide with each other, and are fixed in the first space 21.

In the present embodiment, the converging lens 4 and the optical fiber connector 5 are directly fixed to the base 2. In the present embodiment, the converging lens 4 is formed from glass, and is fixed to the base 2 using a resin adhesive (not illustrated). Specifically, in the first space 21, an adhesive is disposed between the base 2 and a side surface of the converging lens 4 that faces the base 2. In addition, an adhesive is also disposed between the converging lens 4 and a step surface 23 to be described later. Namely, in the present embodiment, a side surface of the base 2 that faces the converging lens 4 in the first space 21 and the step surface 23 correspond to a fixing region. By increasing the first space 21 and the fixing region, fixing strength can be ensured, and optical axis misalignment of the converging lens 4 with respect to the base 2 can be suppressed.

In addition, in the present embodiment, the optical fiber connector 5 is formed from metal, and is fixed to the base 2 by being press-fitted thereinto. Therefore, in the present embodiment, a side surface of the base 2 that faces the optical fiber connector 5 in the first space 21 and a region 24 to be described later correspond to a fixing region. By increasing the fixing region, fixing strength can be ensured, and optical axis misalignment of the optical fiber connector 5 with respect to the base 2 can be suppressed. Incidentally, the optical fiber connector 5 may be fixed to the base 2 using an adhesive. In this case, for example, in the first space 21, an adhesive is disposed between the base 2 and a side surface of the optical fiber connector 5 that faces the base 2 and between the optical fiber connector 5 and the region 24. In this case as well, the side surface of the base 2 that faces the optical fiber connector 5 in the first space 21 and the region 24 correspond to a fixing region. By increasing the fixing region, fixing strength can be ensured, and optical axis misalignment of the optical fiber connector with respect to the base can be suppressed.

A first positioning portion configured to position the converging lens 4 in the first direction D1 is formed in the base 2, and the converging lens 4 is fixed to the base 2 in a state where the converging lens 4 is positioned by the first positioning portion. More specifically, the step surface 23 intersecting an inner surface of the base 2 in the first direction D1, the inner surface forming the first space 21, and facing the first opening 21*a* side is formed, and the converging lens 4 is abutted against the step surface 23, so that the converging lens 4 is positioned in the first direction D1. Namely, in the present embodiment, the step surface 23 is the first positioning portion. A width of the step surface 23 in a direction from the first region 2A toward the second region 2B in the second direction D2 (or the third direction D3) may be smaller than the maximum value of the thickness of the converging lens 4 in the first direction D1, or may be smaller than the minimum value of the thickness of the converging lens 4 in the first direction D1. By reducing the width of the step surface 23, the shielding of light, which is incident on the converging lens 4 and which travels toward the optical fiber 6, by the step surface 23 can be suppressed as much as possible.

In addition, a second positioning portion configured to position the optical fiber connector 5 in the first direction D1 is formed in the base 2, and the optical fiber connector 5 is fixed to the base 2 in a state where the optical fiber connector 5 is positioned by the second positioning portion. Here, the optical fiber connector 5 includes a small-diameter portion on the tip side accommodated in the first space 21, and a large-diameter portion that is larger in diameter than the small-diameter portion, and a step surface between the small-diameter portion and the large-diameter portion is abutted against the region 24 around the second opening 21*b* of the second surface 2*r*, so that the optical fiber connector 5 is positioned in the first direction D1. Namely, in the present embodiment, the region 24 of the second surface 2*r* is the second positioning portion. Incidentally, the width of the step surface 23 and the region 24 in the second direction D2 and the third direction D3 is, for example, approximately 0.5 mm.

Incidentally, flat surfaces are formed on parts of an outer surface (the third surface 2*t* connecting the first surface 2*s* and the second surface 2*r*) of the base 2, and a plurality of (four in the light source unit 1) holes 2*h* for fixing the light source unit 1 to an external member are formed on the flat surfaces (refer to FIGS. 1 and 3). By forming the flat surfaces on the outer surface of the base 2, the flat surfaces can be pressed against and fixed to the external member. Incidentally, the same applies to light source units 1A to 1C to be described later.

Each of the plurality of light sources 3 is held by the base 2 while at least a light emitting region (for example, a filament and a lens portion) 3*r* is accommodated in the second space 22. When the light source 3 includes a filament, the temperature of the filament reaches 2200° C. when the light source unit 1 is in use. Further, in the present embodiment, since the small base 2 holds the plurality of light sources 3, as will be described later, the configuration of the present embodiment that can suppress heat generation of the base 2 and the influence of heat on the converging lens 4 is effective.

In the present embodiment, a part on a tip side of the light source 3 that includes the light emitting region 3*r* is accommodated in the second space 22, and the remaining portion of the light source 3 protrudes from the second space 22 toward a second surface 2*r* side. The light emitting region 3*r* of the light source 3 is located closer to a first surface 2*s* side than the end surface on a converging lens 4 side of the optical fiber 6, and the light source 3 does not protrude from the second space 22 toward the first surface 2*s* side. Therefore, in the present embodiment, the first surface 2*s* of the base 2 does not include a protruding portion and is flat. The light source 3 is disposed such that the light emitting region 3*r* thereof faces the first surface 2*s* side. Therefore, the object is irradiated from the first surface 2*s* side with light emitted from the light emitting region 3*r*. In addition, light from the object is incident on the converging lens 4 from the first surface 2*s* side.

Incidentally, an insertion hole Ba into which a fixing member B such as a screw for fixing the light source 3 to the base 2 is inserted is formed in the base 2. The insertion hole Ba is open to at least the second surface 2*r*. In the present embodiment, a pair of the insertion holes Ba are provided for one light source 3. The pair of insertion holes Ba are formed to sandwich one second space 22 therebetween along a direction (radial direction of the base 2) intersecting an arrangement direction of the second spaces 22 (circumferential direction of the base 2). For example, when the insertion holes Ba penetrate through the base 2, the insertion holes Ba can be formed such that the tips of the fixing members B do not protrude from the first surface 2*s*. Accordingly, the first surface 2*s* of the base 2 can be brought into contact with, for example, a glass or the like to perform measurement. In addition, when the insertion holes Ba are open only to the second surface 2*r* (namely, when the insertion holes Ba is recesses), the insertion holes Ba can be formed (with a margin) such that the tip portions of the fixing members B do not reach terminals (bottoms of the recesses) on the first surface 2*s* side of the insertion holes Ba. Accordingly, the light source 3 can be reliably fixed by the fixing members B.

Figure 4:
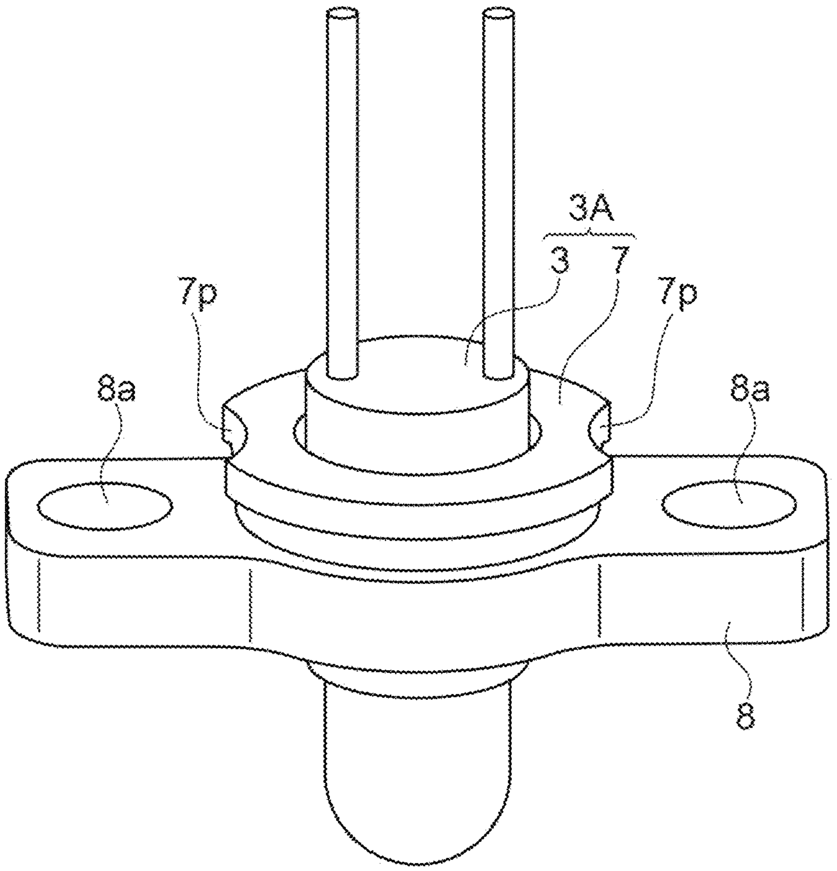
FIG. 4 is a perspective view of a light source assembly including a light source shown in FIGS. 1 and 2, and a support member.
Figure 5:
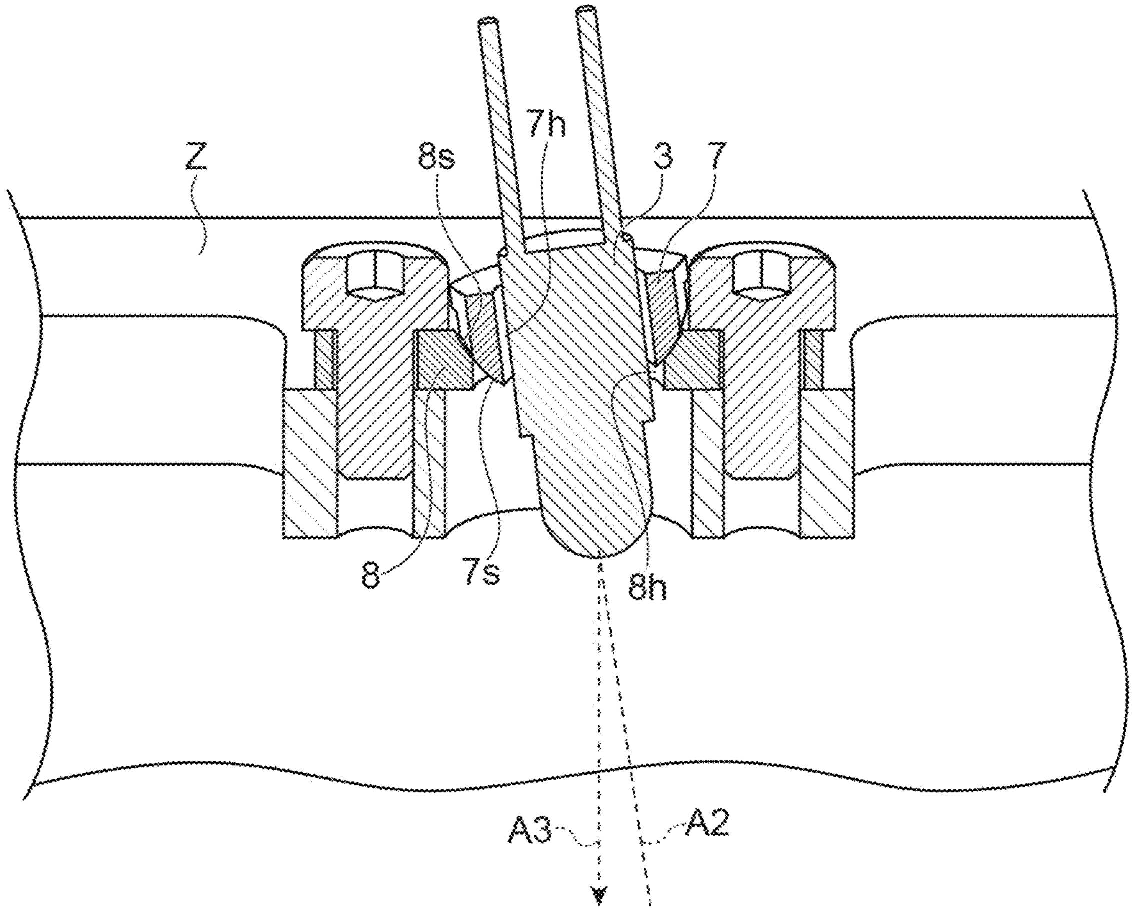
FIG. 5 is a cross-sectional view showing a mode of optical axis adjustment of the light source in the light source assembly shown in FIG. 4.

Here, FIG. 4 is a perspective view of a light source assembly including the light source shown in FIGS. 1 and 2, and a support member. FIG. 5 is a cross-sectional view showing a mode of optical axis adjustment of the light source in the light source assembly shown in FIG. 4. FIG. 5 shows a state where the light source assembly and the support member are attached to a jig Z for adjusting an optical axis. As shown in FIGS. 1, 2, 4, and 5, the light source unit 1 includes a plurality of (the same number as the light sources 3) holding members 7 that hold the respective light sources 3 to constitute light source assemblies 3A together with the light sources 3, and a plurality of (the same number as the light source assemblies 3A) support members 8 configured to support the light source assemblies 3A via the holding members 7.

The holding member 7 has a through-hole 7*h*, and holds the light source 3 by inserting the light source 3 into the through-hole 7*h*. The support member 8 has a through-hole 8*h*, and supports the light source assembly 3A via the holding member 7 by inserting the light source assembly 3A into the through-hole 8*h*. A pair of insertion holes 8*a* are formed in the support member 8 to sandwich the through-hole 8*h* therebetween, the light source assembly 3A being inserted into the through-hole 8*h*. The support member 8 is formed in an elongated shape in a direction in which the pair of insertion holes 8*a* are aligned, and a width of the support member 8 in a longitudinal direction is, for example, approximately 15 mm. The support member 8 is fixed to the base 2 by inserting (for example, screwing) the common fixing members B into the insertion holes 8*a* and the insertion holes Ba of the base 2. Namely, the light source 3 is held on the base 2 by fixing the support member 8, which supports the light source assembly 3A, to the second surface 2*r* of the base 2. In addition, the support member 8 (namely, the light source assembly 3A) is detachably fixed to the base 2. Incidentally, cutout portions 7*p* for preventing interference of the holding member 7 with the fixing member B (screw) are formed in the holding member 7. Accordingly, the distance between the holding member 7 and the fixing member B can be reduced, and the downsizing of the light source unit 1 can be realized.

The holding member 7 and the support member 8 are in contact with each other. More specifically, an outer surface of the holding member 7 that surrounds the through-hole 7*h* and an inner surface of the through-hole 8*h* of the support member 8 are in contact with each other. A contact surface 7*s* of the holding member 7 with the support member 8 and a contact surface 8*s* of the support member 8 with the holding member 7 are sliding surfaces that are slidable against each other. As one example, the contact surface 7*s* and the contact surface 8*s* have hemispherical shapes that intersect an optical axis A2 of the light source 3 and that are complementary to each other, and accordingly, are slidable against each other around an axis intersecting the optical axis A2.

Namely, the support member 8 includes the contact surface 8*s* serving as a sliding surface configured to support the holding member 7 so as to be slidable around the axis intersecting the optical axis A2. Accordingly, by sliding the holding member 7 in a state where the holding member 7 is inserted into the through-hole 8*h* of the support member 8, the orientation of the optical axis A2 of the light source 3 can be adjusted. The optical axis A2 in FIG. 5 indicates the optical axis of the light source 3 when no optical axis misalignment occurs, and an optical axis A3 indicates the optical axis that is adjusted by sliding of the holding member 7 when an optical axis misalignment occurs.

The optical axis misalignment of the light source 3 can occur due to, for example, manufacturing errors of the filament in the light emitting region 3*r* of the light source 3 or the like. If an optical axis misalignment occurs, light cannot be emitted to the object at an angle that is intended when the holding member 7 is fixed to the base 2, which is not preferable. Therefore, in the present embodiment, the optical axis misalignment of the light source 3 is corrected using the jig Z. For example, in FIG. 5, the optical axis of the light source 3 is misaligned from A2 to A3. The photodetector (not illustrated) that receives the light emitted from the light source 3 is disposed on a lower side of the jig Z, and the orientation of the light source 3 is adjusted by sliding the light source assembly 3A (holding member 7) with respect to the support member 8 such that the light is emitted perpendicularly to a surface (surface with which the support member 8 is brought into contact) of the jig Z. After the adjustment, the support member 8 is removed from the jig Z, and the support member 8 is fixed to the base 2 using the fixing members B. In such a manner, the light can be emitted perpendicularly to the second surface 2*r* of the base 2, and as will be described later, a configuration in which the optical axes A2 of the light sources 3 intersect each other at an intersection point C can be reliably realized. In addition, in the present embodiment, the optical axis is adjusted using the jig Z; however, the optical axis may be adjusted by fixing the support member 8 to the base 2 and then sliding the light source assembly 3A. In a state where optical axis adjustment is performed, the holding member 7 is fixed to the support member 8 using a resin such as a UV-curable resin or a thermosetting resin. However, the holding member 7 and the support member 8 may be fixed to each other using laser welding.

The light source unit 1 is configured such that the optical axes A2 of the light sources 3 intersect each other at the intersection point C by fixing the plurality of light source assemblies 3A, the optical axes of which have been adjusted as described above, to the base 2 via the support members 8. The distance between the intersection point C and the first surface 2*s* of the base 2 in the first direction D1 defines a measurement distance D (distance to the object) in the light source unit 1. In the present embodiment, an angle between the optical axis A2 of the light source 3 and the optical axis A1 of the converging lens 4 and the optical fiber 6 (an inclination angle of the optical axis A2) is, as one example, approximately 30°, and the measurement distance D is, as one example, approximately 15 mm. In the light source unit 1, the angle of the inclined surface of the second surface 2*r* with respect to the first surface 2*s* is set such that the inclination angle of the optical axis A2 is approximately 30°.

Figure 6:
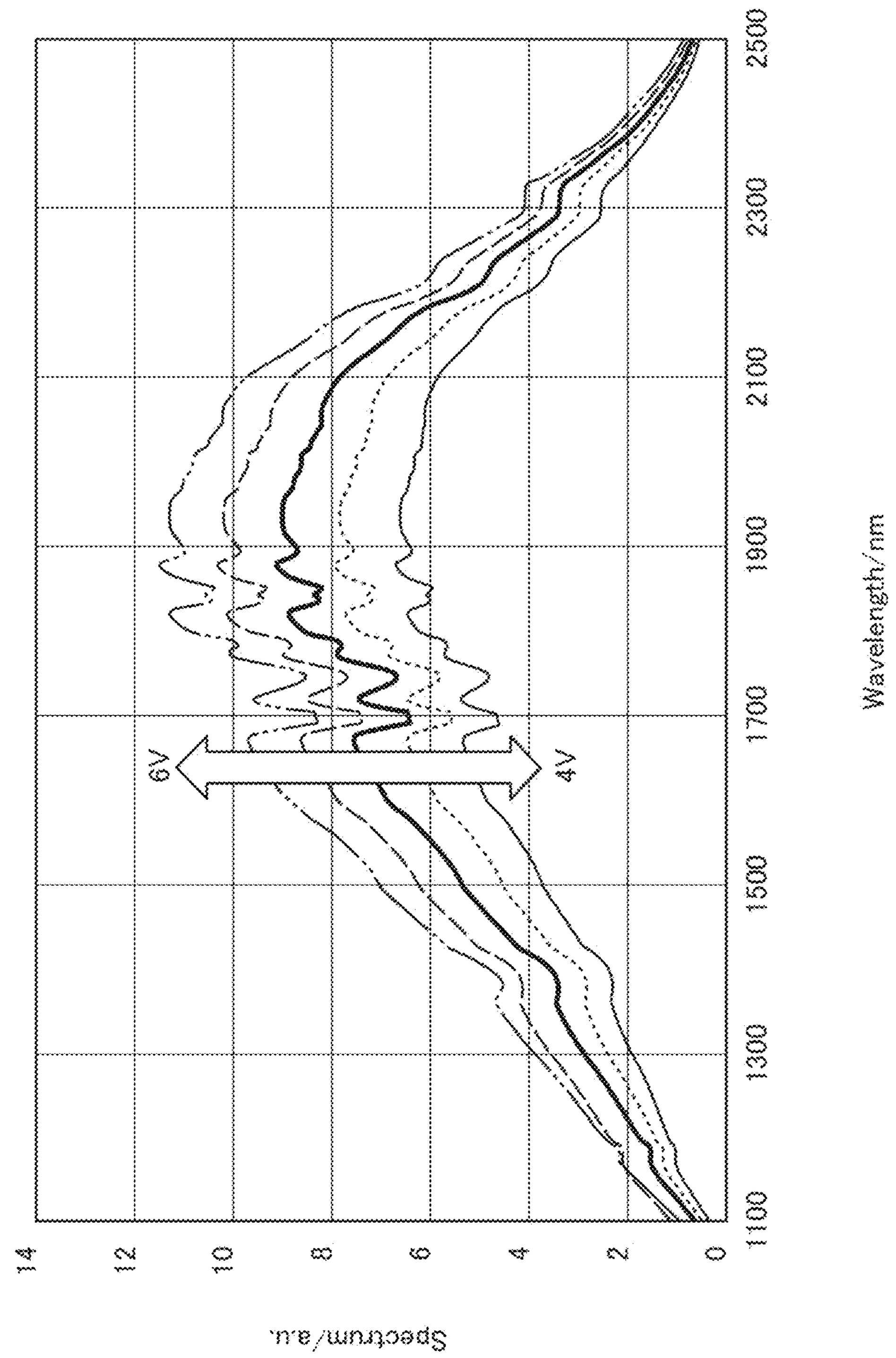
FIG. 6 is a graph showing changes in the amount of detected light when the voltage applied to the light source is changed.

In such a manner, when the measurement distance D is relatively large, a problem in which the amount of light per unit area on the object attenuates due to the directional characteristics of the light source 3 can occur. To address this problem, as shown in FIG. 6, when the voltage applied to the light source 3 is increased, the amount of detected light is also increased. However, in this case, increasing the applied voltage may cause a failure of the light source 3, and the lifespan of the light source 3 is shortened, which is a risk. Meanwhile, in the light source unit 1, by increasing the number of (eight in the present embodiment) the light sources 3, the amount of light per unit area on the object can be ensured, and the problem is solved. In addition, when the measurement distance D is relatively large, a problem in which the diffused light from the object diverges and becomes less likely to be guided to the optical fiber 6 can occur. Meanwhile, in the light source unit 1, by fixing the converging lens 4, which converges the diffused light from the object toward the incident end surface of the optical fiber 6, to the base 2, the diffused light from the object can be efficiently guided to the optical fiber 6, and the problem is solved.

As described above, in the light source unit 1 according to the present embodiment, the plurality of light sources 3 that emit light with which the object is to be irradiated, the converging lens 4 for converging the light from the object, and the optical fiber connector 5 for holding the optical fiber 6 that receives the incidence of the light converged by the converging lens 4 are held by the same base 2. The base 2 has the first surface 2*s* and the second surface 2*r* opposite to the first surface 2*s*, and when viewed in the first direction D1 intersecting the first surface 2*s*, includes the first region 2A including the center of the base 2, and the second region 2B surrounding the first region 2A. The first space 21 that is a through-hole that opens to the first surface 2*s* and the second surface 2*r* is formed in the first region 2A, and the second space 22 that opens to at least the first surface 2*s* is formed in the second region 2B. The light source 3 is held by the base 2 such that at least the light emitting region 3*r* is accommodated in the second space 22.

Therefore, the object is irradiated from the first surface 2*s* side of the base 2 with the light emitted from the light emitting region 3*r* of the light source 3. In other words, the light from the object is incident on the first surface 2*s* of the base 2. Meanwhile, the converging lens 4 is held by the base 2 while at least a part of the converging lens 4 is accommodated in the first space 21 that opens to the first surface 2*s* of the base 2. Therefore, by locating the converging lens 4 closer to the object, the light from the object that is incident from the first surface 2*s* side of the base 2 can be made to be more efficiently incident on the optical fiber 6 (held by the optical fiber connector 5).

Here, in the light source unit 1, by making the base 2 using metal having a relatively high thermal conductivity, heat dissipation is improved. Further, by making the first region 2A of the base 2 thicker than the second space 22 of the base 2 that accommodates the light emitting region 3*r* of the light source 3, the first space 21 that accommodates the converging lens 4 and the like being provided in the first region 2A, the thermal capacity of the first region 2A is ensured. As a result, the transfer of heat generated in the light emitting region 3*r* of the light source 3 to the converging lens 4 can be suppressed, and the influence of heat on the converging lens 4 can be reduced.

The influence of heat on the converging lens 4 includes, for example, as described above, the risk of expansion of the converging lens 4 due to heat, misalignment of the focal position due to the thermal lens effect, and occurrence of damage to the converging lens 4, and when the converging lens 4 is fixed to a holder using resin, the fixing strength decreases due to the heat, so that an optical axis misalignment of the converging lens occurs, which is a risk. Particularly, in the present embodiment, since the base 2 is formed from metal and the converging lens 4 is formed from glass, when heat is transferred to the converging lens 4, damage is likely to occur in the converging lens 4 due to a difference in thermal expansion coefficient. As described above, since such influence of heat on the converging lens 4 becomes more pronounced when many light sources 3 are used to ensure the amount of light per unit area on the object, it becomes more important to suppress the influence of heat.

Incidentally, by making the first region 2A of the base 2 relatively thick, the first space 21 that accommodates the converging lens 4 and the optical fiber connector 5 being provided in the first region 2A, the optical fiber connector 5 can be inserted deeper into the first space 21, or the fixing region for the converging lens 4 in the first space 21 can be sufficiently ensured. Therefore, optical axis misalignment in the converging lens 4 and the optical fiber connector 5 can be suppressed. Further, at least a part of the converging lens 4 and at least the light emitting region 3*r* of the light source 3 are accommodated in the first space 21 and the second space 22, respectively. For this reason, the converging lens 4 and the light emitting region 3*r* of the light source 3 can be reliably protected by the base 2. Further, by making the second region 2B relatively thin, the second space 22 that accommodates at least the light emitting region 3*r* of the light source 3 being provided in the second region 2B, the light emitting region 3*r* can be located closer to the object, so that the amount of light per unit area with which the object is to be irradiated can be ensured.

In addition, in the light source unit 1 according to the present embodiment, the first positioning portion (step surface 23) configured to position the converging lens 4 in the first direction D1 is formed in the base 2, and the converging lens 4 is fixed to and held by the base 2 in a state where the converging lens 4 is positioned by the step surface 23. For this reason, the converging lens 4 can be accurately fixed to the base 2.

In addition, in the light source unit 1 according to the present embodiment, the second positioning portion (region 24 around the second opening 21*b* of the second surface 2*r*) configured to position the optical fiber connector 5 in the first direction D1 is formed in the base 2, and the optical fiber connector 5 is fixed to and held by the base 2 in a state where the optical fiber connector 5 is positioned by the region 24. For this reason, the optical fiber connector 5 can be accurately fixed to the base 2.

In addition, the light source unit 1 according to the present embodiment includes the optical fiber 6 held by the optical fiber connector 5. Furthermore, the light emitting region 3*r* of each of the plurality of light sources 3 is located closer to the first surface 2*s* side than the end surface on the converging lens 4 side of the optical fiber 6. For this reason, the light emitting region 3*r* of the light source 3 and the converging lens 4 can be disposed closer to the object. Therefore, the amount of light per unit area with which the object is to be irradiated can be ensured, and the light from the object can be more efficiently incident on the optical fiber 6.

In addition, in the light source unit 1 according to the present embodiment, each of the plurality of second spaces 22 penetrates through the base 2 to have the fourth opening 22*b* on the second surface 2*r*. In such a manner, by forming the second space 22 as a through-hole, the light source 3 can be mounted on the base 2 from both the first surface 2*s* side and the second surface 2*r* side, so that the light source 3 can be easily mounted on the base 2.

In addition, the light source unit 1 according to the present embodiment includes the plurality of holding members 7 that hold the plurality of respective light sources 3 to constitute the light source assemblies 3A together with the light sources 3, and the plurality of support members 8 configured to support the plurality of respective light source assemblies 3A via the holding members 7. Each of the plurality of light sources 3 is held on the base 2 by fixing the support member 8, which supports the light source assembly 3A, to the second surface 2*r*. Furthermore, each of the plurality of support members 8 includes the contact surface 8*s* configured to support the holding member 7 so as to be slidable around an axis intersecting the optical axis A2 of the light source 3. For this reason, the light source assembly 3A is slidable along the contact surface 8*s* of the support member 8 to change the angle of the optical axis A2 of the light source 3. Therefore, it becomes easier to adjust the optical axis of the light source 3.

In addition, in the light source unit 1 according to the present embodiment, the support member 8 is detachably fixed to the base 2. For this reason, if any of the plurality of light sources 3 fails, the failed light source 3 can be removed and replaced for each support member 8 configured to support the light source assembly 3A.

In addition, in the light source unit 1 according to the present embodiment, the entirety of the converging lens 4 is accommodated in the first space 21. For this reason, the protrusion of the converging lens 4 from the first surface 2*s* of the base 2 can be avoided, and the converging lens 4 can be reliably protected.

Further, in the light source unit 1 according to the present embodiment, the first surface 2*s* of the base 2 is a flat surface. In such a manner, by forming the first surface 2*s* on the object side of the base 2 as a flat surface, the object can be irradiated with light while bringing the first surface 2*s* into contact with, for example, a glass window or the like.

The above embodiment has described one aspect of the light source unit according to the present invention. Therefore, the light source unit according to the present invention is not limited to the light source unit 1 according to the above-described embodiment, and can be modified in any manner. Subsequently, modification examples will be described.

Figure 7:
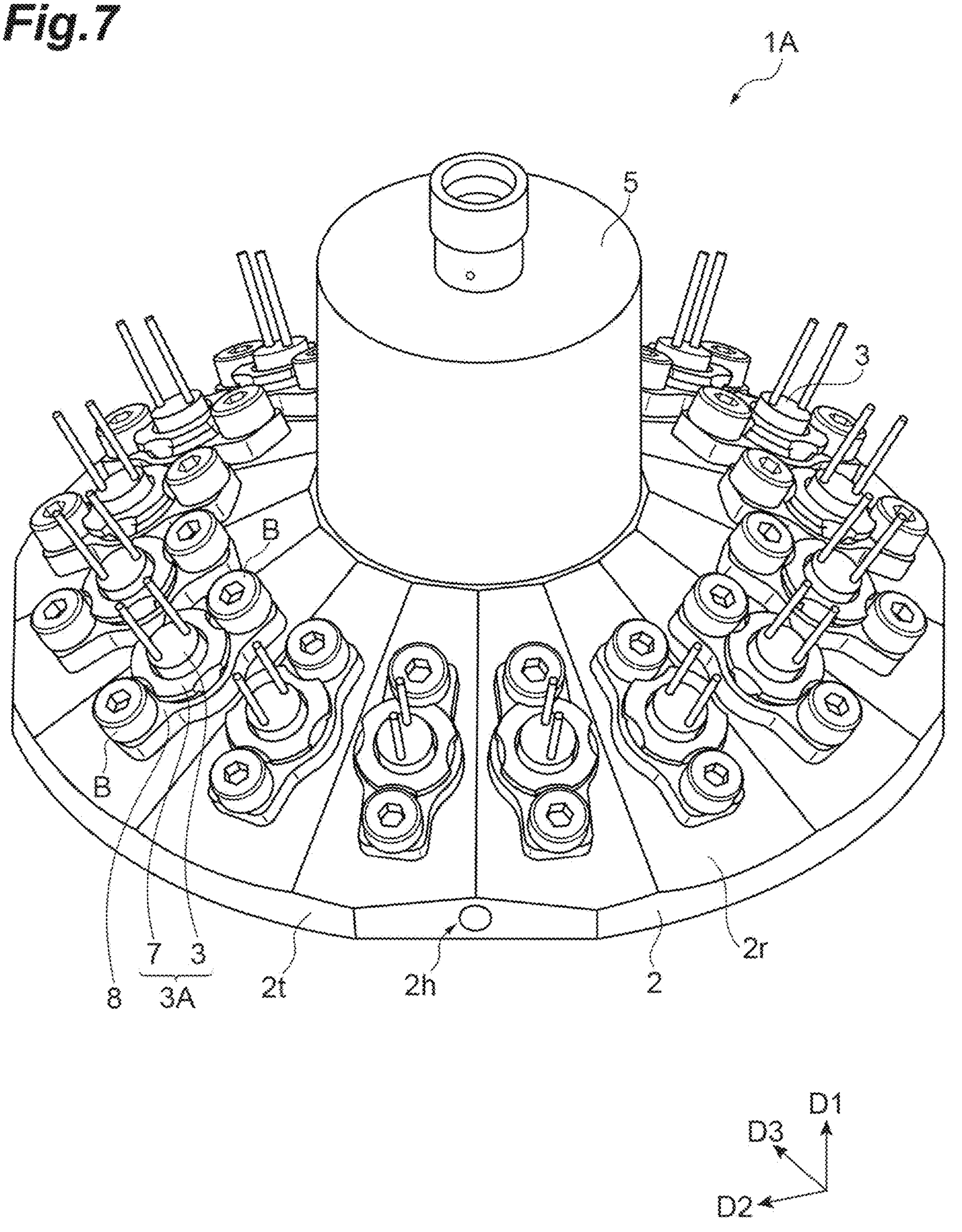
FIG. 7 is a perspective view of a light source unit according to a first modification example.
Figure 8:
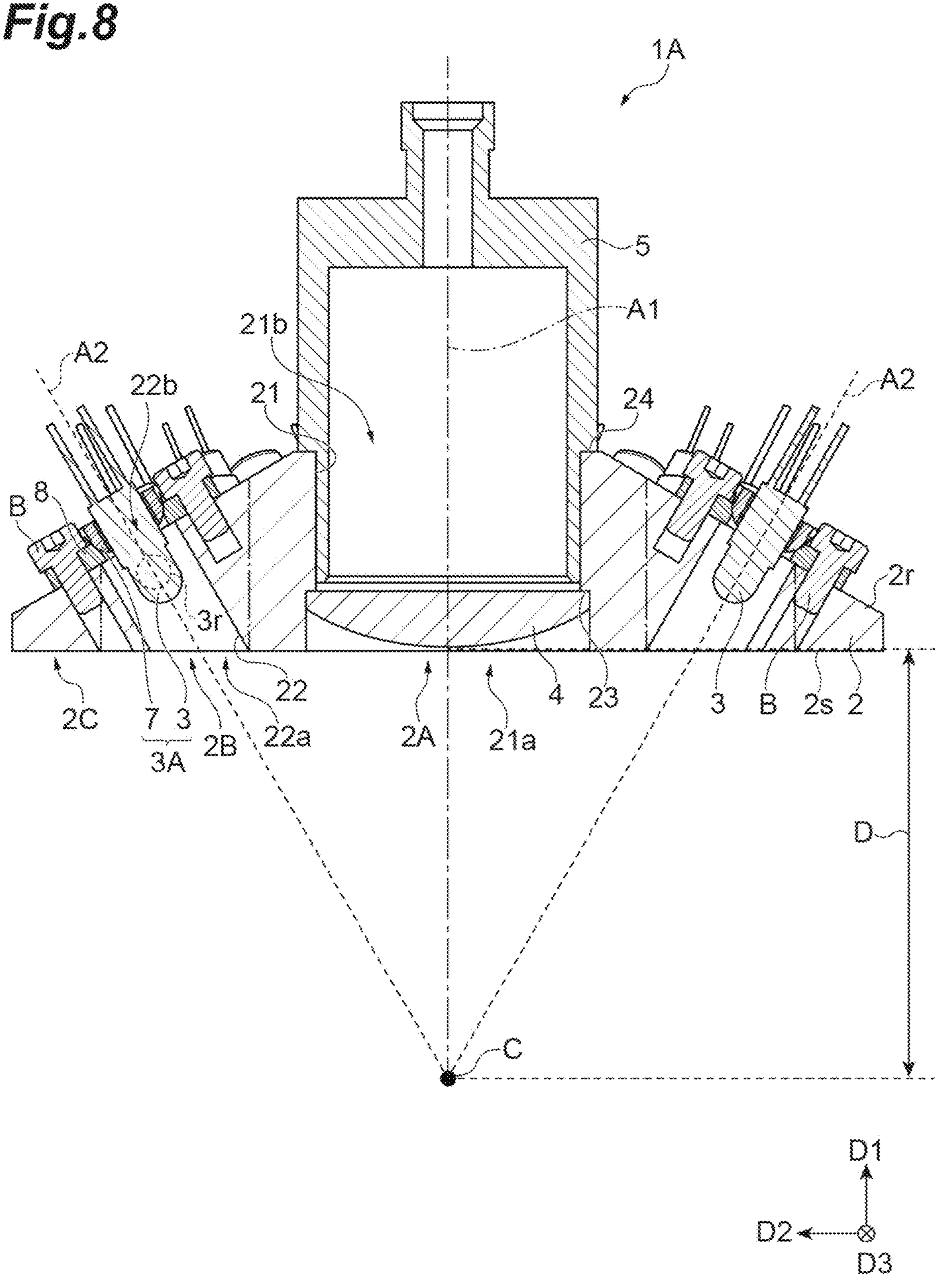
FIG. 8 is a cross-sectional view showing a cross section of the light source unit shown in FIG. 7, which includes the first direction D1 and the second direction D2.

FIG. 7 is a perspective view of a light source unit according to a first modification example. FIG. 8 is a cross-sectional view showing a cross section of the light source unit shown in FIG. 7, which includes the first direction D1 and the second direction D2. A light source unit 1A shown in FIGS. 7 and 8 differs from the light source unit 1 according to the above-described embodiment mainly in the measurement distance D and the number of the light sources 3.

More specifically, the measurement distance D in the light source unit 1A is set to be longer than the measurement distance D in the light source unit 1. As one example, the measurement distance D in the light source unit 1A is approximately 30 mm. As a result, in light source unit 1A, a problem in which the amount of light per unit area on the object is reduced compared to the light source unit 1 occurs. Meanwhile, by providing a larger number of the light sources 3 in the light source unit 1A than the light source unit 1, the problem is solved. As one example, the light source unit 1A includes 16 light sources 3.

In addition, in the light source unit 1A, since the measurement distance D is long, the range where light from the object diverges is also widened. Therefore, the light source unit 1A employs the converging lens 4 that is larger in a plane intersecting the first direction D1 compared to the light source unit 1. In the light source unit 1A, the diameter (width in the second direction D2) of the converging lens 4 may be larger than the thickness of the first region 2A of the base 2 in the first direction D1. Accordingly, the light from the object can be efficiently captured.

One example of dimensions of each portion of the light source unit 1A according to the first modification example will be shown. Namely, the diameter of the converging lens 4 (namely, a width of the first space 21 in the second direction D2 in FIG. 8) is, as one example, approximately 20 mm. The maximum value of the thickness of the converging lens 4 in the first direction D1 is, as one example, approximately 5 mm. The width of the base 2 in the second direction D2 and the third direction D3 is, as one example, approximately 60 mm. The width of the second space 22 is, as one example, approximately 6 mm. The minimum value of the thickness of the base 2 in the first direction D1 is, as one example, approximately 2 mm. The maximum value of the thickness of the base 2 in the first direction D1 is, as one example, approximately 15 mm. The insertion width of the optical fiber connector 5 into the base 2 (the length of a portion of the optical fiber connector 5 in the first direction D1, the portion being inserted into the base 2) is, as one example, approximately 10 mm. The width of the step surface 23 and the region 24 in the second direction D2 and the third direction D3 is, for example, approximately 0.5 mm.

Here, in the light source unit 1A according to the first modification example, the average thickness of the first region 2A in the first direction D1 is thicker than the average thickness of the second region 2B in the first direction D1, and the maximum thickness of the first region 2A in the first direction D1 is thicker than the maximum thickness of the second region 2B in the first direction D1. In addition, the average thickness of the second region 2B in the first direction D1 is made thicker than the average thickness of the third region 2C in the first direction D1. The maximum thickness of the first region 2A is, for example, approximately 15 mm, and the maximum thickness of the second region 2B is, for example, approximately 13 mm.

Figure 9:
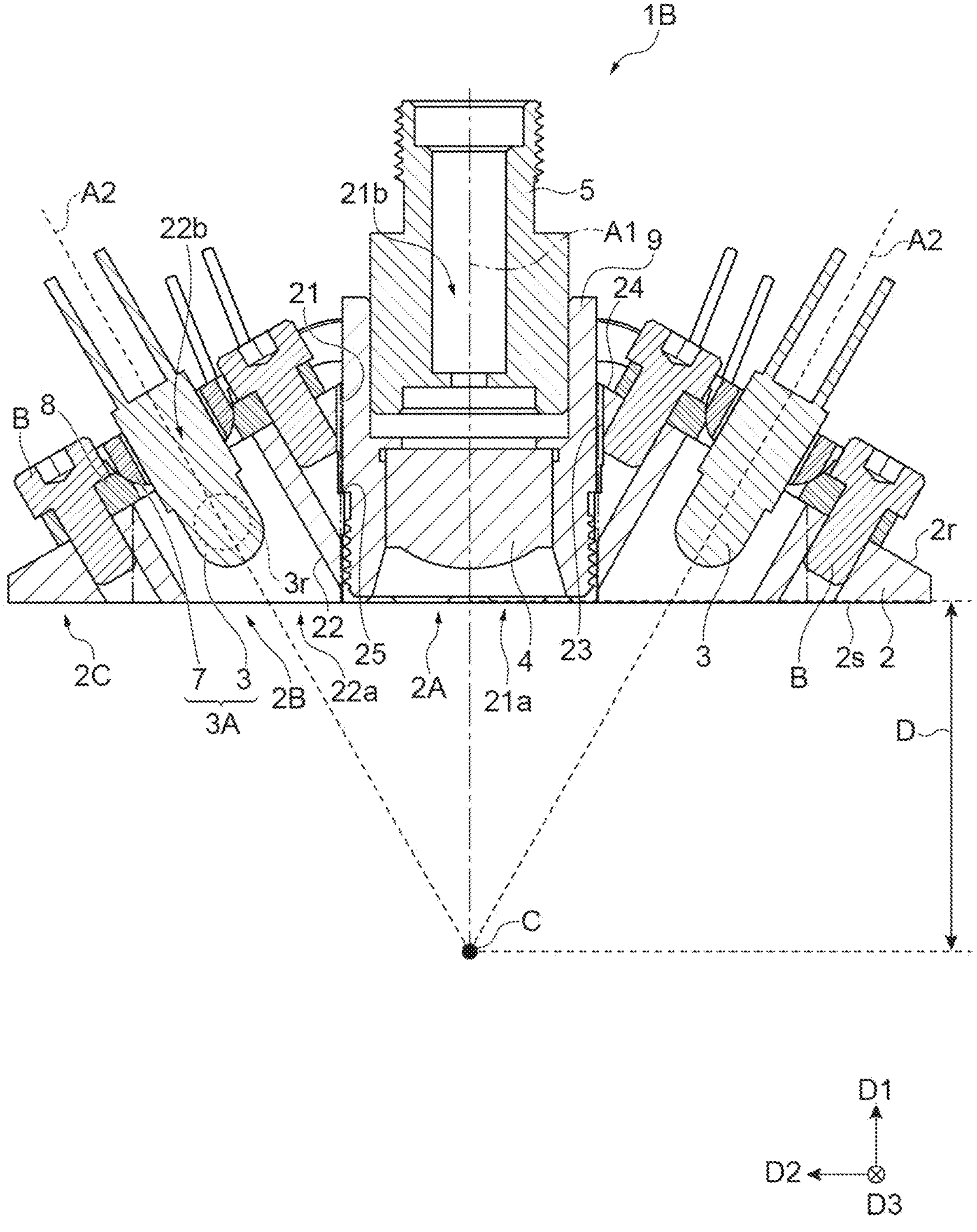
FIG. 9 is a cross-sectional view showing a cross section of a light source unit according to a second modification example, which includes the first direction D1 and the second direction D2.

FIG. 9 is a cross-sectional view showing a cross section of a light source unit according to a second modification example, which includes the first direction D1 and the second direction D2. As shown in FIG. 9, a light source unit 1B differs from the light source unit 1 according to the above-described embodiment in that the converging lens 4 and the optical fiber connector 5 are fixed to the base 2 via a connector 9.

More specifically, the light source unit 1B includes the connector 9 that integrally holds the converging lens 4 and the optical fiber connector 5 in a state where the converging lens 4 and the optical fiber connector 5 are positioned with respect to each other. Furthermore, by inserting the connector 9, which holds the converging lens 4 and the optical fiber connector 5, into the first space 21, the converging lens 4 and the optical fiber connector 5 are held by and fixed to the base 2 via the connector 9. As one example, the connector 9 is fixed to the base 2 by being screwed into the first space 21.

In the light source unit 1B, a step surface 25 intersecting the inner surface of the base 2 in the first direction D1, the inner surface forming the first space 21, and facing the second opening 21*b* is formed. When the screwing of the connector 9 into the first space 21 progresses, the connector 9 abuts against the step surface 25, so that the connector 9 is positioned in the first direction D1. At this time, the converging lens 4 and the optical fiber connector 5 are also positioned at the same time. Namely, the step surface 25 is a first positioning portion configured to position the converging lens 4 in the first direction D1, and is a second positioning portion configured to position the optical fiber connector 5 in the first direction D1. Incidentally, the step surface 25 is formed at a position where a tip of the connector 9 does not protrude from the first surface 2*s* when the connector 9 is butted against the step surface 25.

In such a manner, by using the connector 9 that integrally holds the converging lens 4 and the optical fiber connector 5 that are positioned with respect to each other, the converging lens 4 and the optical fiber connector 5 can be easily installed at desired positions. Incidentally, in the light source unit 1B, the inclination angle of the optical axis A2 of the light source 3 is approximately 30°, and the number of the light sources 3 is 8. In addition, in the light source unit 1B, an adhesive is disposed between the base 2 and a ridge portion (threads) of the connector 9, which is screwed with the base 2. Accordingly, the connector 9 can be prevented from being misaligned with respect to the base 2 after screwing, and optical axis misalignment of the converging lens 4 and the optical fiber connector 5 with respect to the base 2 can be suppressed.

In the present modification example as well, the thickness of the first region 2A of the base 2 in the first direction D1 is larger than the thickness of the second region 2B, and the first space 21 is formed large. For this reason, the connector 9 can be inserted deeply into the base 2, and a large fixing region between the connector 9 and the base 2 can be ensured. Therefore, optical axis misalignment of the optical fiber connector 5 and the converging lens 4 with respect to the base 2 can be suppressed. Incidentally, an adhesive may be disposed over the entire region where the connector 9 and the base 2 face each other. In addition, the connector 9 and the optical fiber connector 5 may be integrally formed from, for example, metal.

One example of dimensions of each portion of the light source unit 1B according to the second modification example will be shown. Namely, the width of the first space 21 in FIG. 9 in the second direction D2 is, as one example, approximately 12 mm. The width of the second space 22 is, as one example, approximately 6 mm. The width of the base 2 in the second direction D2 and the third direction D3 is, as one example, approximately 40 mm. The minimum value of the thickness of the base 2 in the first direction D1 is, as one example, approximately 1 mm. The maximum value of the thickness of the base 2 in the first direction D1 is, as one example, approximately 10 mm. A width of the step surface 25 in the second direction D2 and the third direction D3 is, for example, approximately 0.5 mm.

Here, in the light source unit 1B according to the second modification example, the average thickness of the first region 2A in the first direction D1 is thicker than the average thickness of the second region 2B in the first direction D1. In addition, the average thickness of the second region 2B in the first direction D1 is made thicker than the average thickness of the third region 2C in the first direction D1.

Figure 10:
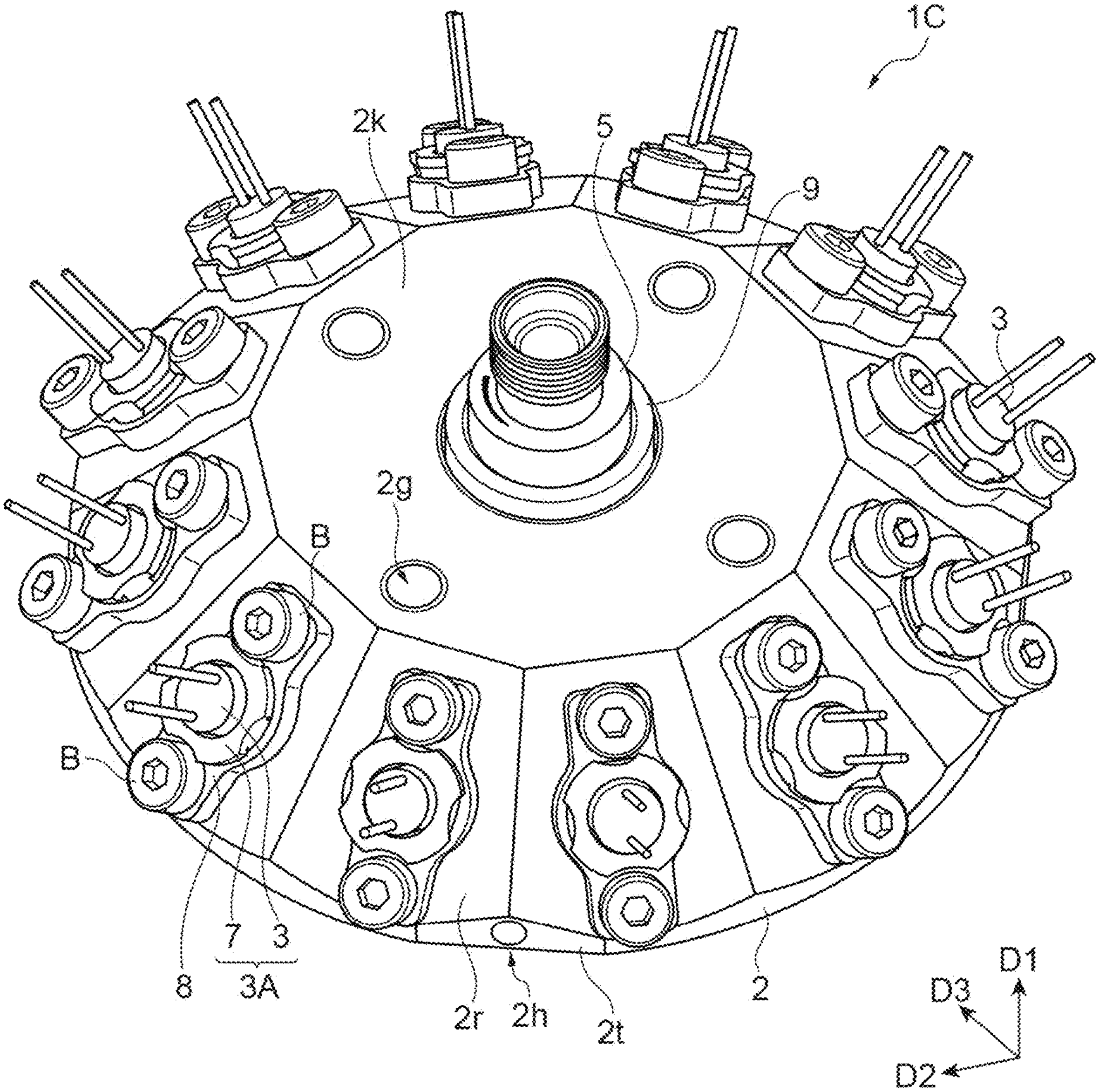
FIG. 10 is a perspective view of a light source unit according to a third modification example.
Figure 11:
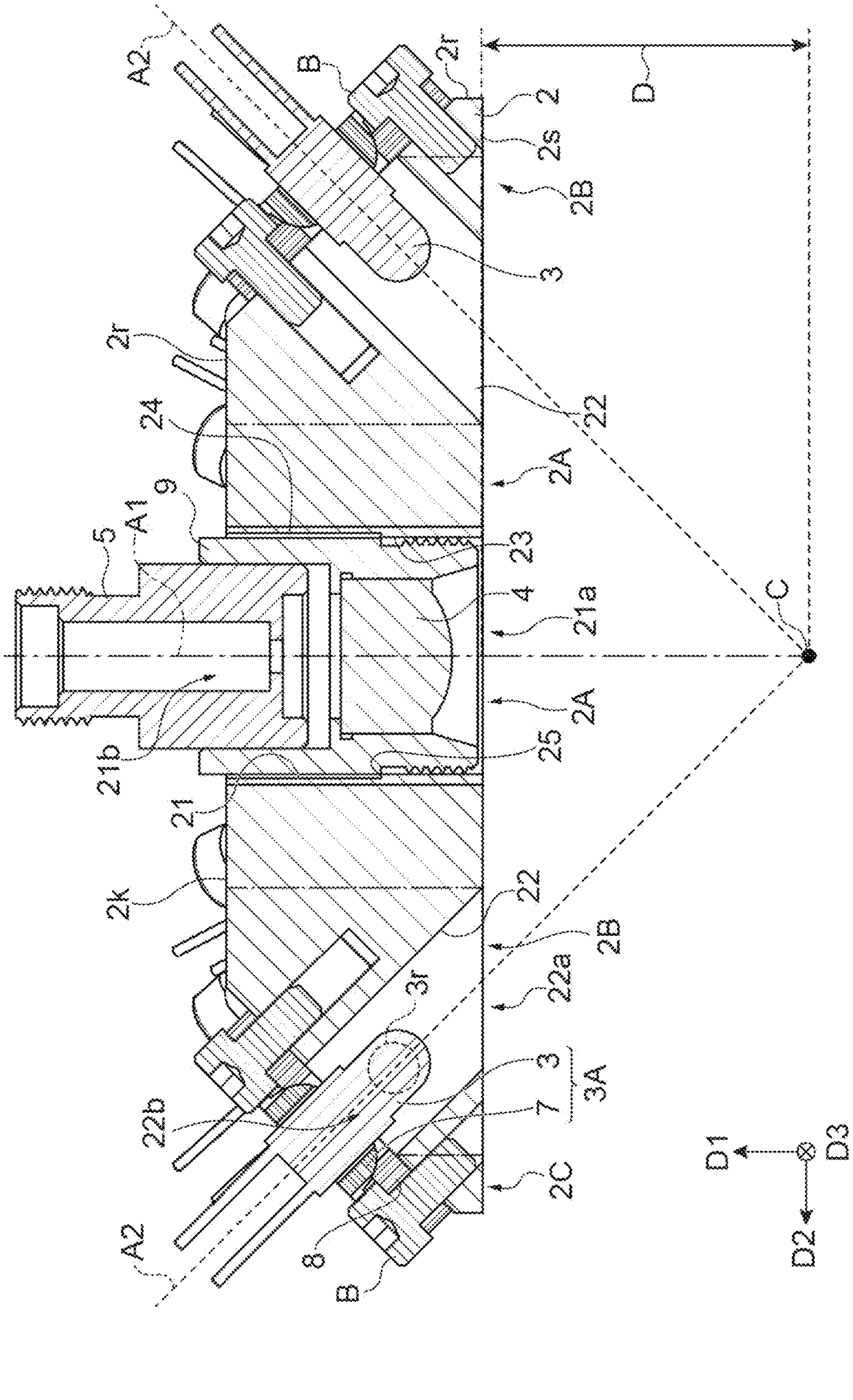
FIG. 11 is a cross-sectional view showing a cross section of the light source unit shown in FIG. 10, which includes the first direction D1 and the second direction D2.

FIG. 10 is a perspective view of a light source unit according to a third modification example, and FIG. 11 is a cross-sectional view showing a cross section of the light source unit shown in FIG. 10, which includes the first direction D1 and the second direction D2. A light source unit 1C shown in FIGS. 10 and 11 differs from the light source unit 1B according to the second modification example in the inclination angle of the optical axis A2 of the light source 3 and the number of the light sources 3. Namely, in the light source unit 1C, the inclination angle of the optical axis A2 of the light source 3 is approximately 45°, and the number of the light sources 3 is 12. In such a manner, when the inclination of the optical axis A2 of the light source 3 is increased, the intersection point C becomes closer to the first surface 2*s*, and the measurement distance D becomes shorter; however, by increasing the distance between the light sources 3 facing each other along directions intersecting the first direction D1, a long measurement distance D can be ensured.

Incidentally, in the light source unit 1C, a flat surface 2*k* intersecting the first direction D1 and parallel to the second direction D2 and the third direction D3 is formed on the second surface 2*r*. A plurality of (here, four) holes 2*g* for fixing the light source unit 1C to an external member are formed on the flat surface 2*k*. By forming the flat surface 2*k* in the base 2, the flat surface 2*k* can be pressed against and fixed to the external member. A width of the flat surface 2*k* (width in the second direction D2 in FIG. 11) may be larger than the thickness of the base 2 in the first direction D1. By ensuring a large width for the flat surface 2*k*, the light source unit 1C can be stably fixed to the external member.

One example of dimensions of each portion of the light source unit 1C according to the third modification example will be shown. Namely, the width of the first space 21 in FIG. 11 in the second direction D2 is, as one example, approximately 12 mm. The width of the second space 22 is, as one example, approximately 6 mm. The width of the base 2 in the second direction D2 and the third direction D3 is, as one example, approximately 50 mm. The width of the flat surface 2*k* in the second direction D2 and the third direction D3 is, as one example, approximately 30 mm. The minimum value of the thickness of the base 2 in the first direction D1 is, as one example, approximately 1 mm. The maximum value of the thickness of the base 2 in the first direction D1 is, as one example, approximately 12 mm. A width of the step surface 25 in the second direction D2 and the third direction D3 is, for example, approximately 0.5 mm.

Here, in the light source unit 1C according to the third modification example, the average thickness of the first region 2A in the first direction D1 is thicker than the average thickness of the second region 2B in the first direction D1. In addition, the average thickness of the second region 2B in the first direction D1 is made thicker than the average thickness of the third region 2C in the first direction D1.

Figure 12:
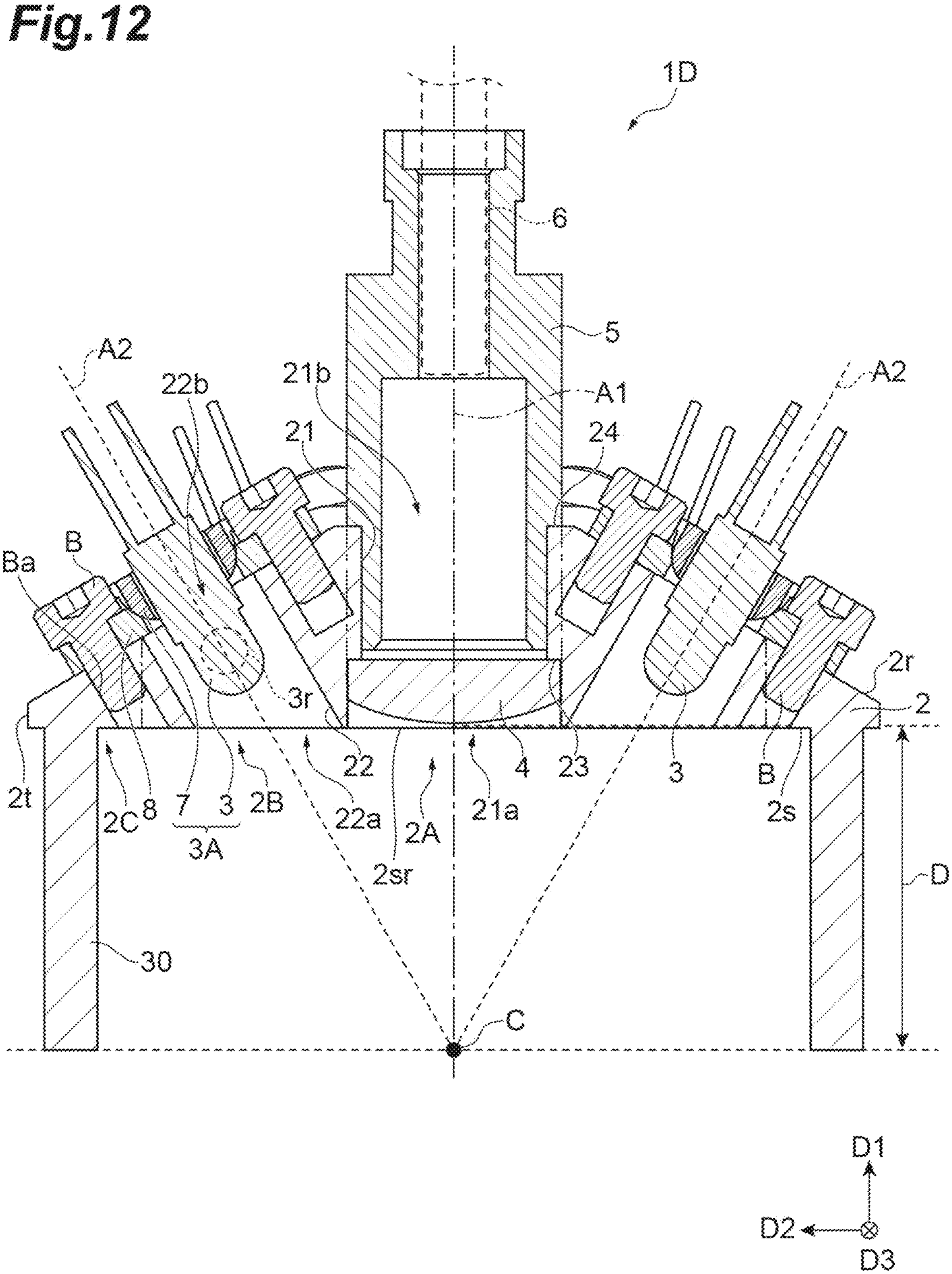
FIG. 12 is a cross-sectional view of a light source unit according to a fourth modification example.
Figure 13A:
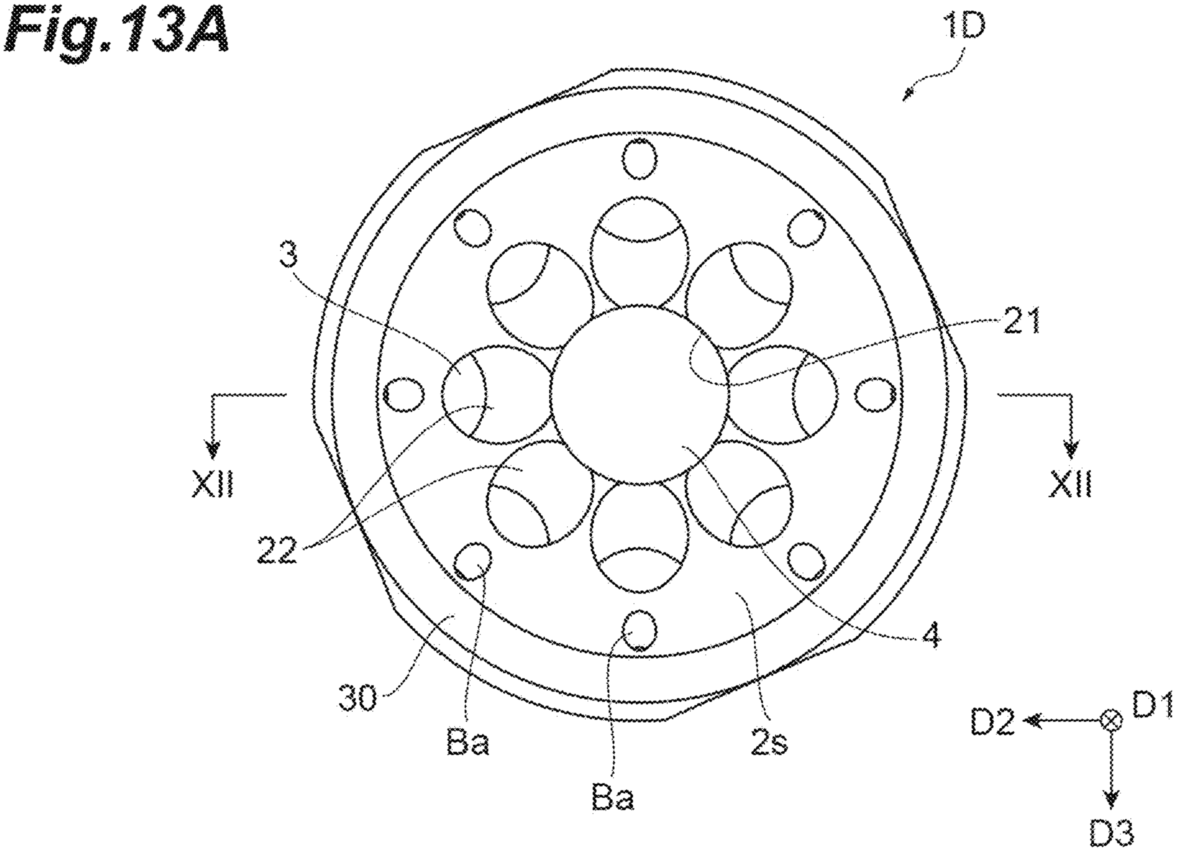
FIGS. 13A and 13B are bottom views of the light source unit shown in FIG. 12.
Figure 13B:
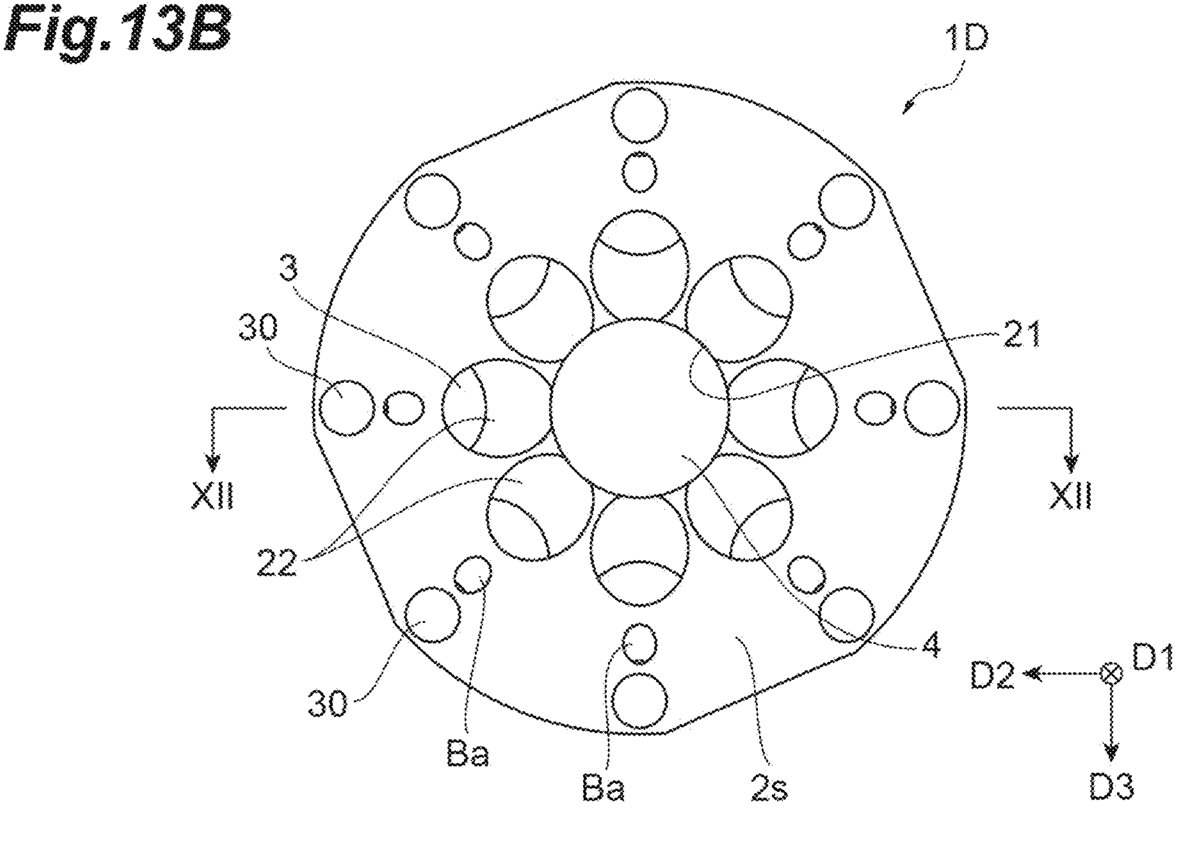

FIG. 12 is a cross-sectional view of a light source unit according to a fourth modification example, and FIGS. 13A, 13B is a bottom view of the light source unit shown in FIG. 12. The cross section of FIG. 12 corresponds to a cross section taken along line XII-XII of FIGS. 13A, 13B. As shown in FIGS. 12 and 13A, 13B, a light source unit 1D according to the fourth modification example differs from the light source unit 1 according to the above-described embodiment in that the base 2 includes a spacer portion 30 that protrudes from a surface 2*sr* on the first surface 2*s* in the third region 2C, the first opening 21*a* and the third openings 22*a* being formed on the surface 2*sr*. Accordingly, the first surface 2*s* is not a flat surface but a surface having a step. The spacer portion 30 is formed integrally with the base 2. The spacer portion 30 is formed to surround the first region 2A and the second region 2B (namely, to surround an irradiation region of light from the light source 3) when viewed in the first direction D1 (when viewed from the first surface 2*s* side). The spacer portion 30 may be formed continuously in an annular shape (here, a circular ring shape) as shown in FIG. 13A, or a plurality of the spacer portions 30 may be provided intermittently at equal spacings along an annular region as shown in FIG. 13B. In this case, one spacer portion 30 can be formed, for example, in a columnar shape. A tip surface of the spacer portion 30 (end surface opposite to the surface 2*sr*) is a flat surface.

A length (namely, a protruding height from the surface 2*sr*) of the spacer portion 30 in the first direction D1 can be set to coincide with, for example, a distance (measurement distance D) from the intersection point C of the optical axes A2 of the plurality of light sources 3 to the surface 2*sr* in the first direction D1. In this case, by disposing the light source unit 1D such that the flat tip surface of the spacer portion 30 is brought into contact with the object, the intersection point C can be aligned with the surface of the object. The length of the spacer portion 30 in the first direction D1 is, for example, approximately 15 mm. Accordingly, a maximum thickness of the third region 2C in the first direction D1 is increased by the length of the spacer portion 30, and is, for example, approximately 17 mm. Accordingly, in the light source unit 1D, the average thickness of the third region 2C in the first direction D1 is thicker than the average thickness of the second region 2B in the first direction D1, and the maximum thickness of the third region 2C in the first direction D1 is thicker than the maximum thicknesses of the first region 2A and the second region 2B in the first direction D1. Incidentally, the width of the spacer portion 30 in a direction intersecting the first direction D1 (for example, a radial direction of the spacer portion 30) is, for example, approximately 3 mm. Incidentally, as another mode, for example, by forming the spacer portion 30 such that the intersection point C is located on a side farther from the surface 2*sr* than the tip surface of the spacer portion 30 in the first direction D1, namely, by making the length of the spacer portion 30 shorter than the measurement distance D, the intersection point C can be aligned inside the object. In such a manner, the length of the spacer portion 30 may not coincide with the measurement distance D.

Incidentally, in the present embodiment, the surface 2*sr* on the first surface 2*s*, the first opening 21*a* and the third openings 22*a* being formed on the surface 2*sr*, can be used as a reference surface for calculating the measurement distance D. Namely, the measurement distance D can be defined as the distance from the intersection point C of the optical axes A2 of the plurality of light sources 3 to the surface 2*sr* in the first direction D1. In addition, in the present embodiment, the surface 2*sr* on which the first opening 21*a* and the third openings 22*a* are formed is used as a reference surface, and the length of the spacer portion 30 is set based on the length from the surface 2*sr* to the intersection point C in the first direction (measurement distance D); however, the spacer portion 30 may be provided simply to separate the surface 2*sr* on which the first opening 21*a* and the third openings 22*a* are formed and the object from each other. In this case, the surface 2*sr* on which the first opening 21*a* and the third openings 22*a* are formed may not be used as a reference surface.

As described above, in the light source unit, the third region 2C thicker than the first region 2A and the second region 2B may be provided outside the second region 2B. In this case, as in the light source unit 1D, such a configuration includes a case where the third region 2C is made thicker than the first region 2A and the second region 2B by forming a protruding portion (spacer portion 30) formed on the first surface 2*s* side in the third region 2C, a case where the third region 2C is made thicker than the first region 2A and the second region 2B by forming a protruding portion on the second surface 2*r* side in the third region 2C, and a case where the third region 2C is made thicker than the first region 2A and the second region 2B by combining both cases.

Namely, in the light source unit, the average thickness of the third region 2C in the first direction D1 may be thicker than the average thickness of the first region 2A in the first direction D1 or the average thickness of the second region 2B in the first direction D1, and the maximum thickness of the third region 2C in the first direction D1 may be thicker than the maximum thickness of the first region 2A in the first direction D1 or the maximum thickness of the second region. In such a manner, by forming a portion, which is thicker than the second region 2B, in the third region 2C, the thermal capacity of the third region 2C is increased, so that it can be made difficult for heat generated in the light emitting region 3*r* of the light source 3 to be transferred to the first region 2A.

In the light source unit 1D according to the fourth modification example described above, when the light source unit 1D is disposed such that the spacer portion 30 comes into contact with the object, the irradiation position of the light from the light source 3 on the object in the first direction D1 can be aligned according to the length of the spacer portion 30 in the first direction D1. Particularly, when the optical axes A2 of the plurality of light sources 3 intersect each other at one point, by setting the length of the spacer portion 30 in the first direction D1 to coincide with the length from the first surface 2*s* to the intersection point C (measurement distance D), positioning can be easily and reliably performed such that the intersection point C is located on the object. In addition, compared to when a spacer formed separately from the base 2 is disposed and used on the first surface 2*s*, the accuracy of alignment can be improved. Further, when the spacer portion 30 is formed continuously in an annular shape when viewed in the first direction D1, compared to when a plurality of columnar spacers are formed, strength can be improved and light from the outside that can become stray light during measurement can be shielded by the spacer portion 30. In this case, the spacer portion 30 functions as a light shielding portion.

The embodiment and various modification examples have been described above; however, the light source unit according to the present invention can be modified in any other manner. For example, in the light source unit 1 according to the embodiment and the light source unit 1A according to the first modification example, the inclination angle of the optical axis A2 of the light source 3 may be set to 45° as in the light source unit 1C according to the third modification example.

In addition, the second space 22 of the base 2 may not be a through-hole, and may not have an opening on the second surface 2*r* of the base 2. In this case, the light source 3 can be fixed to the base 2 to be embedded in the base 2. In this case, the light source 3 can be inserted into the second space 22 from the first surface 2*s* side of the base 2, and can be fixed to the base 2.

Further, the spacer portion 30 of the light source unit 1D according to the fourth modification example may be applied to the light source units 1A, 1B, and 1C according to the other modification examples.

What is claimed is:

1. A light source unit comprising:

a plurality of light sources configured to emit light with which an object is to be irradiated;

a converging lens configured to converge light from the object;

an optical fiber connector configured to hold an optical fiber that receives an incidence of the light converged by the converging lens; and a base made of metal and configured to hold the light sources, the converging lens, and the optical fiber connector, wherein the base includes a first surface, a second surface opposite to the first surface, a first region including a center of the base when viewed in a first direction intersecting the first surface, a second region surrounding the first region when viewed in the first direction, a first space provided in the first region and penetrating through the base to have a first opening on the first surface and a second opening on the second surface, and a plurality of second spaces provided in the second region and having third openings on the first surface, the optical fiber connector is held by the base while at least a part of the optical fiber connector is accommodated in the first space, the converging lens is held by the base while at least a part of the converging lens is accommodated in the first space on a first opening side with respect to an end surface on the first opening side of the optical fiber held by the optical fiber connector, each of the plurality of light sources is held by the base while at least a light emitting region of the light source is accommodated in the second space, a thickness of the first region in the first direction is thicker than a thickness of the second region in the first direction, the second region is defined, in a cross section that passes through the center of the base and includes the first direction and a second direction intersecting the first direction, as a region overlapping the second space in the first direction and from one end part of the second space on the center side of the base to another end part of the second space on a side opposite to the center of the base, along the second direction, the third opening is located on a light emitting surface in the second region, the thickness of the first region in the first direction is defined by a sum of the thicknesses of a metal part and the first space, the thickness of the second region in the first direction is defined by a sum of thicknesses of a metal part and the second space, and an average thickness of the first region in the first direction is thicker than an average thickness of the second region in the first direction.

2. The light source unit according to claim 1, wherein a first positioning portion configured to position the converging lens in the first direction is formed in the base, and the converging lens is fixed to and held by the base in a state where the converging lens is positioned by the first positioning portion.

3. The light source unit according to claim 1, wherein a second positioning portion configured to position the optical fiber connector in the first direction is formed in the base, and the optical fiber connector is fixed to and held by the base in a state where the optical fiber connector is positioned by the second positioning portion.

4. The light source unit according to claim 1, further comprising:

the optical fiber held by the optical fiber connector, wherein the light emitting region of each of the plurality of light sources is located closer to a first surface side than the end surface on a converging lens side of the optical fiber.

5. The light source unit according to claim 1, wherein each of the plurality of second spaces penetrates through the base to have a fourth opening on the second surface.

6. The light source unit according to claim 1, further comprising:

a plurality of holding members that hold the plurality of respective light sources to constitute light source assemblies together with the light sources; and a plurality of support members configured to support a plurality of the respective light source assemblies via the holding members, wherein each of the plurality of light sources is held on the base by fixing the support member, which supports the light source assembly, to the second surface, and each of the plurality of support members includes a sliding surface configured to support the holding member so as to be slidable around an axis intersecting an optical axis of the light source.

7. The light source unit according to claim 6, wherein the support members are detachably fixed to the base.

8. The light source unit according to claim 1, wherein an entirety of the converging lens is accommodated in the first space.

9. The light source unit according to claim 1, wherein the first surface is a flat surface.

10. The light source unit according to claim 1, wherein the base includes a third region surrounding the second region when viewed in the first direction, and a spacer portion protruding from a surface on the first surface in the third region, the first opening and the third openings being provided on the surface.

11. A light source unit comprising:

a plurality of light sources configured to emit light with which an object is to be irradiated;

a converging lens configured to converge light from the object;

an optical fiber connector configured to hold an optical fiber that receives an incidence of the light converged by the converging lens;

a base made of metal and configured to hold the light sources, the converging lens, and the optical fiber connector;

a plurality of holding members that hold the plurality of respective light sources to constitute light source assemblies together with the light sources; and a plurality of support members configured to support a plurality of the respective light source assemblies via the holding members, wherein the base includes a first surface, a second surface opposite to the first surface, a first region including a center of the base when viewed in a first direction intersecting the first surface, a second region surrounding the first region when viewed in the first direction, a first space provided in the first region and penetrating through the base to have a first opening on the first surface and a second opening on the second surface, and a plurality of second spaces provided in the second region and having third openings on the first surface, the optical fiber connector is held by the base while at least a part of the optical fiber connector is accommodated in the first space, the converging lens is held by the base while at least a part of the converging lens is accommodated in the first space on a first opening side with respect to an end surface on the first opening side of the optical fiber held by the optical fiber connector, each of the plurality of light sources is held by the base while at least a light emitting region of the light source is accommodated in the second space, a thickness of the first region in the first direction is thicker than a thickness of the second region in the first direction, each of the plurality of light sources is held on the base by fixing the support member, which supports the light source assembly, to the second surface, and each of the plurality of support members includes a sliding surface configured to support the holding member so as to be slidable around an axis intersecting an optical axis of the light source.

12. The light source unit according to claim 11, wherein the support members are detachably fixed to the base.

* * * * *